(12) United States Patent  
Steiger et al.

(10) Patent No.: US 7,641,253 B2
(45) Date of Patent: Jan. 5, 2010

(54) ADJUSTABLE SHELVING SYSTEM FOR VEHICLES

(75) Inventors: William Steiger, Hudson, OH (US); Keith Ping, Danville, KY (US); Dennis Bazzy, Douglasville, GA (US); Dale A. Panasewicz, Strongsville, OH (US); Dennis M. Futo, Strongsville, OH (US); George E. Scherff, Tieriaverde, FL (US); Shane O. Baker, Danville, KY (US)

(73) Assignee: L&P Property Management Company, South Gate, CA (US)

( * ) Notice: Subject to any disclaimer, the term of this patent is extended or adjusted under 35 U.S.C. 154(b) by 294 days.

(21) Appl. No.: 11/501,476

(22) Filed: Aug. 9, 2006

(65) Prior Publication Data

US 2008/0012375 A1    Jan. 17, 2008

Related U.S. Application Data

(63) Continuation-in-part of application No. 10/821,366, filed on Apr. 9, 2004, now abandoned.

(51) Int. Cl.
*B60P 3/00* (2006.01)
(52) U.S. Cl. .................................... 296/24.4
(58) Field of Classification Search ............... 296/24.4, 296/24.44
See application file for complete search history.

(56) References Cited

U.S. PATENT DOCUMENTS

| | | |
|---|---|---|
| 1,115,345 A | 10/1914 | Steuernagel |
| 1,833,081 A | 11/1931 | Kilmer |
| 1,954,085 A | 4/1934 | McMillan |
| 2,424,217 A | 7/1947 | Bales |
| 2,721,632 A | 10/1955 | Surpierre |
| 2,766,092 A | 10/1956 | Dennison |
| 2,811,404 A | 10/1957 | Brooks et al. |
| 2,978,153 A | 4/1961 | Brindle |
| 3,323,656 A * | 6/1967 | Weiss et al. ................. 211/153 |
| 3,338,651 A | 8/1967 | Jacobson |
| 3,341,270 A | 9/1967 | Sohl |
| 3,572,874 A | 3/1971 | Hassel |
| 3,848,942 A | 11/1974 | Fanini |
| 4,191,436 A | 3/1980 | Cherry |
| 4,249,295 A | 2/1981 | Lance |

(Continued)

OTHER PUBLICATIONS http://www.capworld.com/TruckAccessories/ByManufacutrer/crown.htm, Sep. 22, 2005; 4 pgs.

(Continued)

*Primary Examiner*—H Gutman
(74) *Attorney, Agent, or Firm*—Michael Best & Friedrich LLP

(57) ABSTRACT

Adjustable storage units for a vehicle and a method for providing such units are disclosed. The storage units generally include opposing end panels connected by a connecting member along the rear of the end panels. One or more shelf supports are releasably connected to the inner surface of the end panels only through apertures in the end panels. Shelves and/or drawer systems are made from polymer materials are then disposed between the end panels. The end panels may also be made of polymer materials. The storage units are adjustable or reconfigurable by removing the shelves or drawers and repositioning the shelf supports or drawer supports as desired.

11 Claims, 28 Drawing Sheets

U.S. PATENT DOCUMENTS

| | | | |
|---|---|---|---|
| 4,418,967 | A | 12/1983 | Winkelman, Jr. et al. |
| 4,681,381 | A | 7/1987 | Sevey |
| 4,815,394 | A * | 3/1989 | Ettlinger et al. ............. 108/107 |
| 4,852,749 | A | 8/1989 | Fernandez et al. |
| 5,048,902 | A | 9/1991 | Daly |
| 5,244,265 | A | 9/1993 | Chiang |
| 5,327,682 | A | 7/1994 | Holtz |
| D355,798 | S | 2/1995 | Goetz |
| 5,398,987 | A | 3/1995 | Sturgis |
| 5,466,058 | A | 11/1995 | Chan |
| 5,482,342 | A | 1/1996 | Kowalski et al. |
| 5,498,048 | A | 3/1996 | Shelby, Jr. |
| 5,590,939 | A | 1/1997 | Piontek |
| D379,615 | S | 6/1997 | Hellhake et al. |
| D379,616 | S | 6/1997 | Hellhake et al. |
| 5,642,923 | A | 7/1997 | Meacham et al. |
| 5,743,584 | A | 4/1998 | Lance et al. |
| 5,743,607 | A | 4/1998 | Teufel et al. |
| 5,762,213 | A | 6/1998 | Heneveld, Sr. |
| 5,813,735 | A | 9/1998 | Wu |
| 5,893,620 | A | 4/1999 | Birgelis |
| 5,897,154 | A | 4/1999 | Albertini et al. |
| 5,988,476 | A | 11/1999 | Olerio |
| 6,007,129 | A | 12/1999 | Kearney, Jr. |
| D420,970 | S | 2/2000 | Sacco et al. |
| 6,050,660 | A | 4/2000 | Gurley |
| D426,512 | S | 6/2000 | Ciuba |
| D426,728 | S | 6/2000 | Lara |
| D429,095 | S | 8/2000 | Grosfillex |
| 6,138,583 | A | 10/2000 | Mahone et al. |
| 6,186,456 | B1 | 2/2001 | Marsh |
| 6,189,945 | B1 | 2/2001 | Rockett |
| 6,203,087 | B1 | 3/2001 | Lance et al. |
| 6,386,412 | B1 | 5/2002 | Konechne |
| 6,422,629 | B2 | 7/2002 | Lance et al. |
| 6,520,514 | B2 | 2/2003 | Clegg |
| 6,561,601 | B1 | 5/2003 | Maffeo |
| 6,641,236 | B2 | 11/2003 | Grudzien |
| 6,644,712 | B1 | 11/2003 | Rafi-Zadeh |
| D485,227 | S | 1/2004 | Graham |
| D498,617 | S | 11/2004 | Murphy et al. |
| 6,824,184 | B2 | 11/2004 | Leitner et al. |
| 6,824,232 | B2 | 11/2004 | Farmer |
| D539,036 | S | 9/2005 | Panasewicz et al. |
| D525,934 | S | 8/2006 | Panasewicz et al. |
| D536,659 | S | 2/2007 | Panasewicz et al. |
| D509,178 | S | 3/2007 | Pott et al. |
| D549,154 | S | 8/2007 | Panasewicz et al. |
| D553,555 | S | 10/2007 | Panasewicz et al. |
| 7,318,614 | B2 | 1/2008 | Steiger et al. |
| D566,649 | S | 4/2008 | Panasewicz et al. |
| 2005/0168115 | A1 | 8/2005 | Moon et al. |
| 2006/0175945 | A1 | 8/2006 | Deguchi |
| 2007/0069542 | A1 | 3/2007 | Steiger et al. |

OTHER PUBLICATIONS

Canadian Intellectual Property Office Office Action, received for Canadian Patent Application No. 2,553,095, mailed Mar. 12, 2009.

U.S. Patent and Trademark Office Non-Final Office Action, received for U.S. Appl. No. 11/237,189, mailed Nov. 8, 2006.

U.S. Patent and Trademark Office Non-Final Office Action, received for U.S. Appl. No. 11/237,189, mailed Feb. 8, 2007.

U.S. Patent and Trademark Office Final Office Action, received for U.S. Appl. No. 11/237,189, mailed Jun. 22, 2007.

U.S. Patent and Trademark Office Advisory Action before the Filing of an Appeal Brief, received for U.S. Appl. No. 11/237,189, mailed Aug. 30, 2007.

U.S. Patent and Trademark Office Final Office Action, received for U.S. Appl. No. 11/237,189, mailed Oct. 31, 2007.

U.S. Patent and Trademark Office Final Office Action, received for U.S. Appl. No. 11/237,189, mailed May 13, 2008.

U.S. Patent and Trademark Office Final Office Action, received for U.S. Appl. No. 11/237,189, mailed Nov. 17, 2008.

U.S. Patent and Trademark Office Final Office Action, received for U.S. Appl. No. 11/237,189, mailed Apr. 14, 2009.

\* cited by examiner

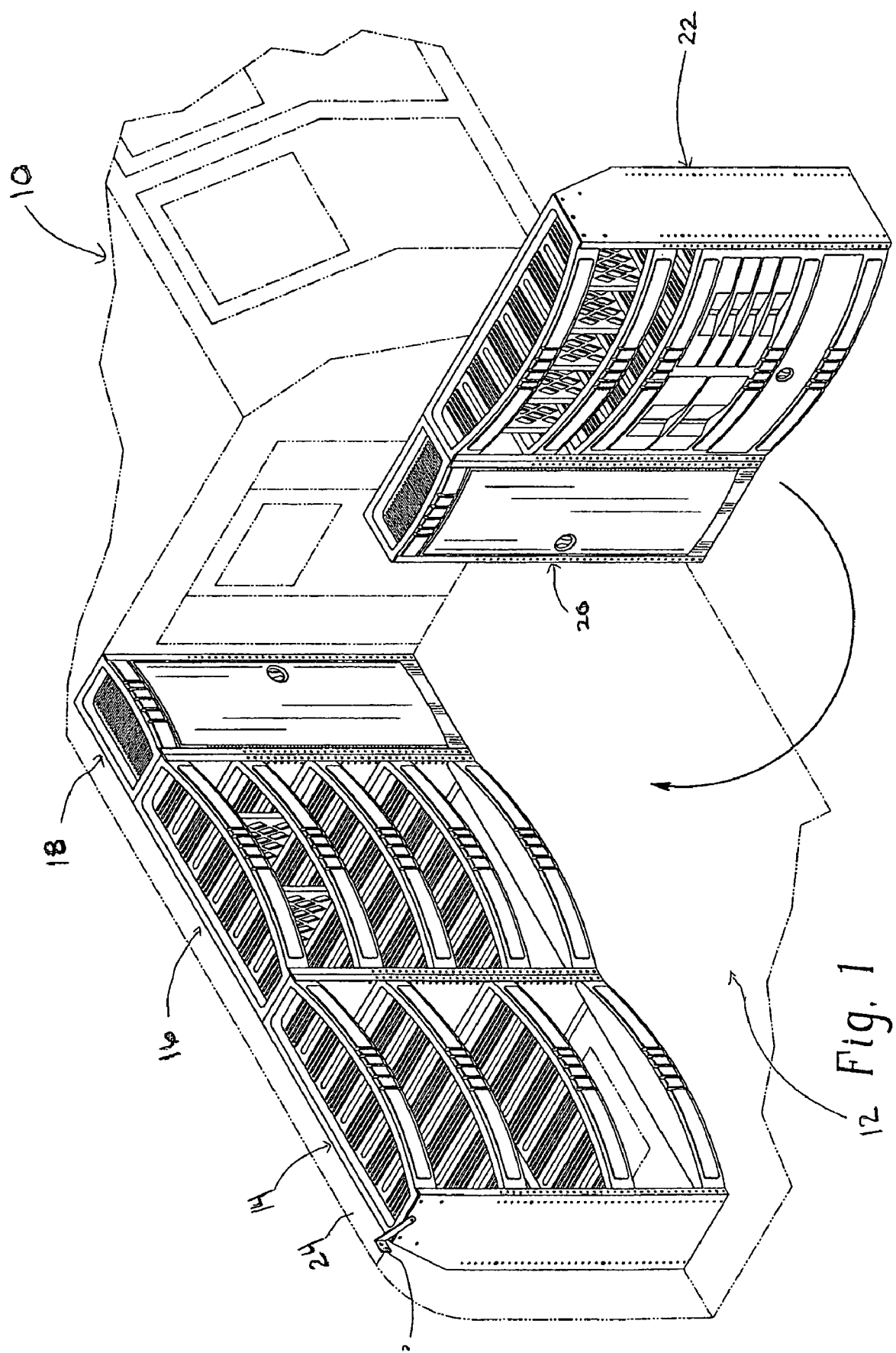

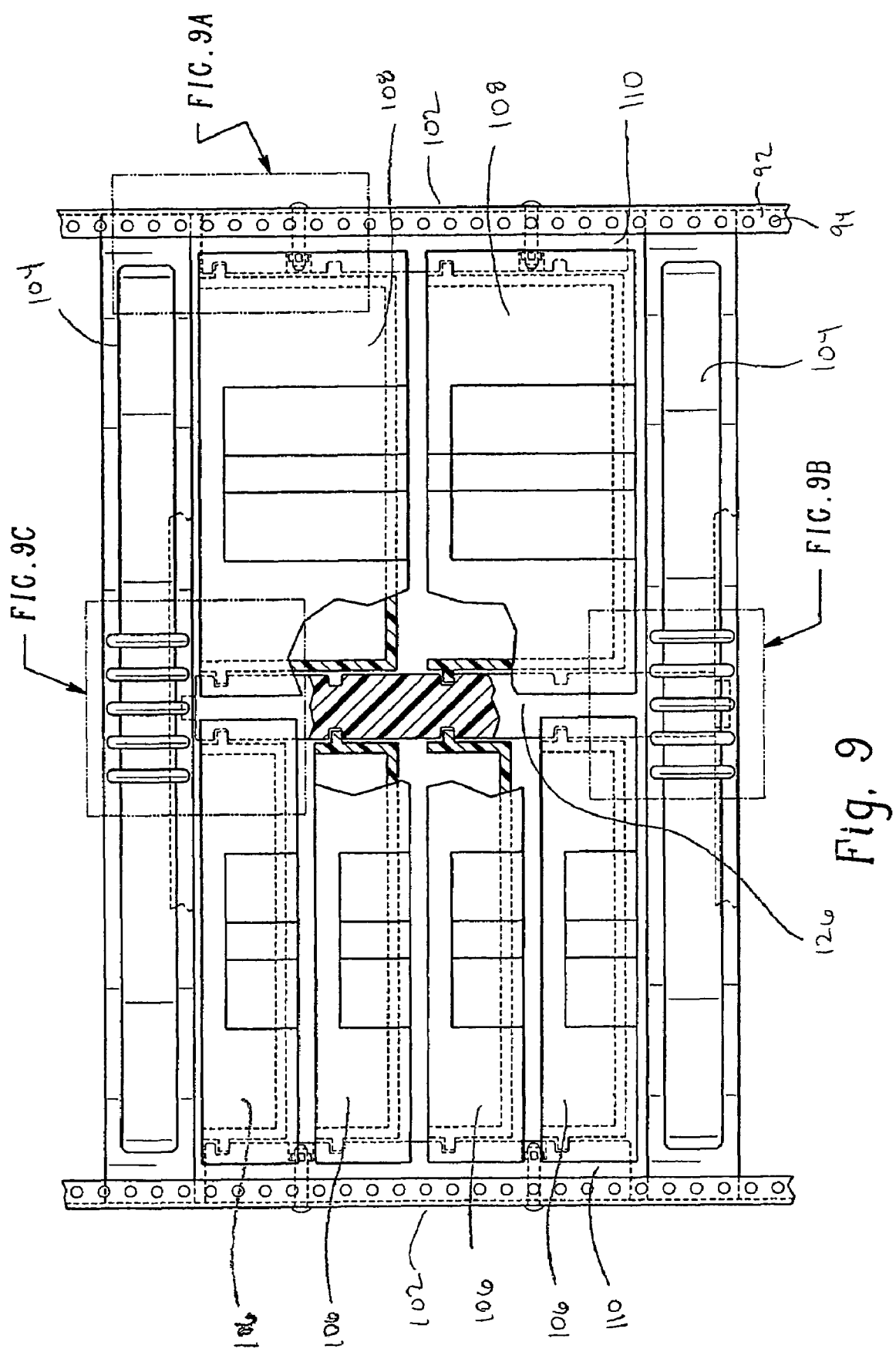

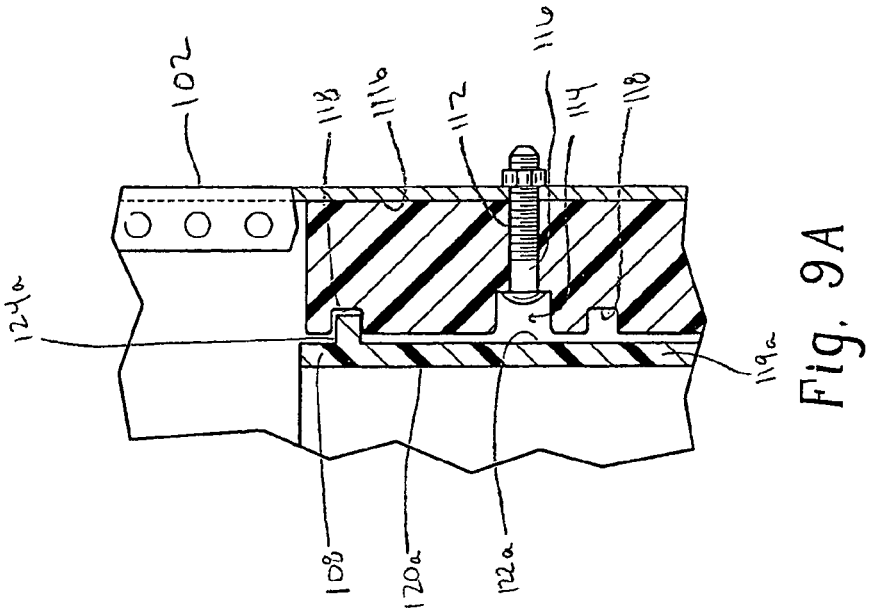
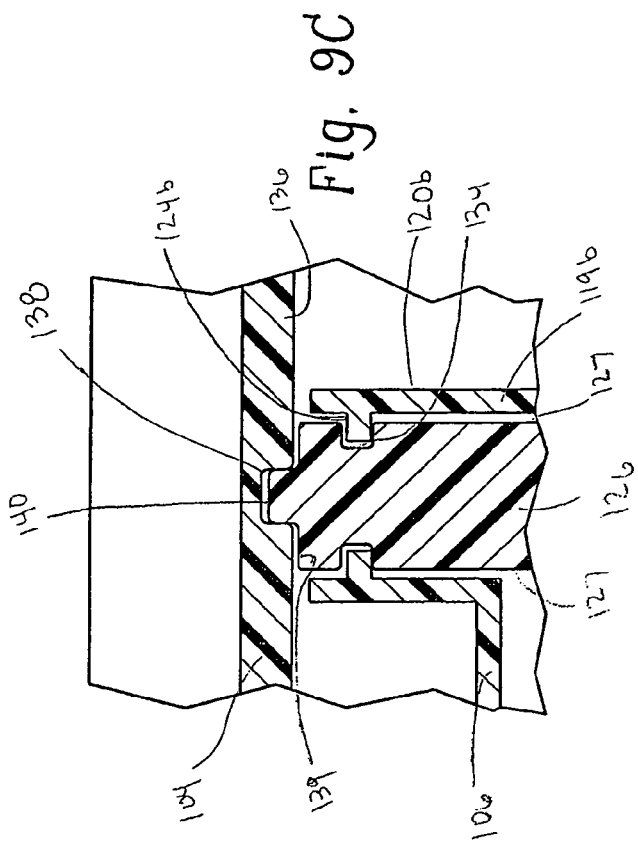
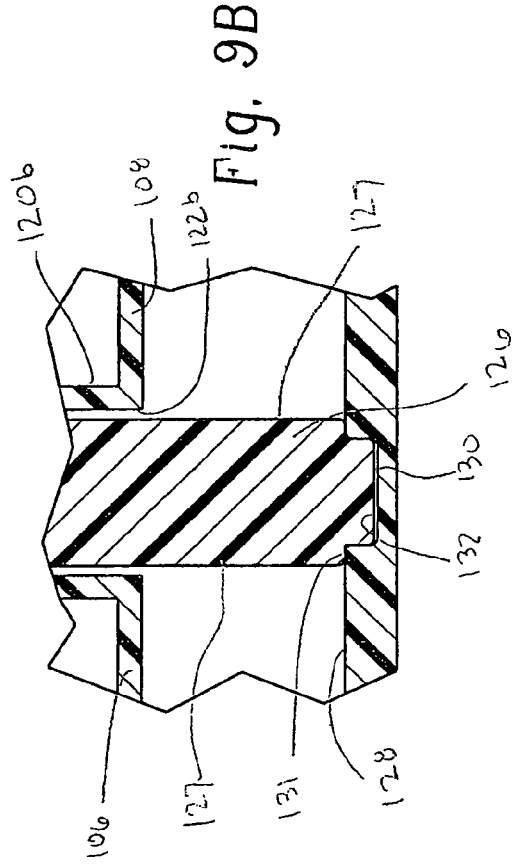

US 7,641,253 B2

ADJUSTABLE SHELVING SYSTEM FOR VEHICLES

CROSS-REFERENCE TO RELATED APPLICATION

This application is a continuation-in-part of U.S. patent application Ser. No. 10/821,366, entitled "ADJUSTABLE SHELVING SYSTEM FOR VEHICLES", filed Apr. 9, 2004 now abandoned by Dale A. Panasewicz, Dennis M. Futo, George E. Scherff, and Shane O. Baker.

BACKGROUND

The present invention relates to storage units for vehicles and specifically to an adjustable storage system for use in vehicles.

Service professionals, e.g., plumbers, contractors, cable or telephone installers, electricians, etc., are commonly required to carry in their vehicles a large number and variety of tools, parts, equipment and the like necessary to perform their work. The tools, parts, equipment, etc., can range from large or bulky tools or spools of cable to smaller tools, fasteners, spare parts, etc. As such, it is known to equip service vehicles with storage units to house items of various sizes.

Many of the storage units known in the art are steel units that include steel end panels, a back panel and steel shelving. The shelves of these storage units are essentially tray structures having a bottom and four sides extending perpendicular from and perpendicular to the bottom. The shelves are fitted between the two end panels adjacent the back panel to provide a storage unit. The shelves are held in position by connecting the shelves directly to each of the end panels and the back panel. The shelves may be held in position by welding the sides of the shelves to the end panels and the back panel or by mechanical fasteners connecting the shelves to each of the end and back panels through the sides of the shelves.

There are several disadvantages associated with these known storage units. Storage units known in the art are essentially as-is structures that are not easily reconfigurable or adjustable. It may be advantageous or even necessary for a worker to house an item in the vehicle for which no space currently exists. Therefore, it would be beneficial for the worker to be able to reconfigure the storage system in his vehicle by moving, adding or removing shelving, drawers, etc. Shelves that are welded to the end and back panels are not removable (or, at least, not easily removed). In the storage unit described above, shelves or drawers are connected to both back panels and the end panels and therefore cannot be adjusted or reconfigured without either completely removing the unit from the vehicle or unmounting the end panels and back panel.

Additionally, several disadvantages are associated with the all steel construction of the storage units. First, the all steel construction may create a noisy environment. When empty, the steel units are prone to rattling during the operation of the vehicle. The noise level may be increased when the units are filled with various equipment including metal tools or parts. Second, the all steel units can be rather heavy, and added weight to a vehicle may increase fuel consumption for operation of the vehicle and increase the cost to operate the vehicle.

In view of the foregoing, it is therefore an object of the invention to provide storage units for vehicles having storage components, such as drawers, or the like, that are readily adjustable, reconfigurable and/or customizable by the user.

It is a further object to provide an adjustable storage unit wherein the means for adjusting or reconfiguring the shelving or drawers is easily accessible to the user.

It is still a further object to provide a storage unit that provides a reduced noise environment compared to conventional storage units.

It is yet another object to provide a storage system that is lighter in weight compared to conventional storage units.

SUMMARY

The present invention achieves one or more of the foregoing objects and provides in one aspect an adjustable storage unit for a vehicle that includes a frame system fastened to a wall of a vehicle, at least one pair of opposing shelf supports releasably connected to the frame system, and at least one shelf formed from a polymer material disposed in the frame system. The frame system includes a pair of end panels opposite and parallel to one another. Each end panel has an inner surface, an outer surface, a front edge, a rear edge, a vertical row of apertures near the front edge and a vertical row of apertures near the rear edge. The frame system also includes at least one connecting member connected to each end panel adjacent the rear edges of the end panels. The at least one pair of opposing shelf supports is releasably connected to the frame system only through the apertures of the end panels. The at least one shelf is supported within the frame system by contacting the bottom surface of the shelf with a top surface of the shelf support.

The invention provides in another aspect, an adjustable storage unit for a vehicle comprising a pair of opposing end panels, a connecting member fixed to each end panel adjacent the rear edges of the end panels, at least one pair of opposing shelf supports releasably connected to the end panels, and at least one shelf formed from a polymer material disposed between the end panels. Each end panel has an outer surface, an inner surface, a rear edge, a front edge, a vertical row of apertures adjacent the rear edge, and a vertical row of apertures adjacent the front edge. The at least one pair of opposing shelf supports is releasably connected to the inner surface of the end panels only through apertures in the end panels. The storage unit is connected to a vehicle through at least one aperture in one of the end panels.

In yet another aspect, the invention provides an adjustable storage unit for a vehicle comprising a first end panel formed from a polymer material, a second end panel formed from a polymer material, a connecting member connecting the first and second end panels, at least one shelf support releasably connected to the first end panel, at least one shelf support releasably connected to the second end panel and positioned opposite the at least one shelf support releasably connected to the first end panel, and at least one shelf formed from a polymer material positioned between the end panels and supported by the bottom surface of the shelf resting on an upper surface of the shelf supports. Each of the first and second end panels has an inner surface, an outer surface, a front edge, a rear edge, a vertical row of apertures near the front edge, and a vertical row of apertures near the rear edge. The second end panel is positioned opposite and substantially parallel to the first end panel so that the inner surface of the second panel faces the inner surface of the first end panel. Each shelf support has an upper surface, and each at least one shelf has a bottom surface, and the at least one shelf is positioned between the end panels and supported by the shelf bottom surface resting on the upper surface of the shelf support.

In still a further aspect, the invention provides a method of providing an adjustable storage unit for a vehicle. The method includes providing a frame system that includes a pair of end panels opposite and parallel one another, and a connecting member connected to each end panel near the rear edge of the end panels. The end panels each have an inner surface, an outer surface, a front edge, a rear edge, a vertical row of apertures near the front edge, and a vertical row of apertures near the rear edge. The method also includes releasably connecting at least one pair of opposing shelf supports, having upper surfaces, only to the end panels, positioning at least one shelf having a bottom surface in the frame system so that the bottom surface of the shelf rests upon the upper surfaces of the shelf support. The at least one shelf is made from a polymer material. The storage unit is adjusted by removing at least one shelf, disconnecting the pair of shelf support supporting the removed shelf, positioning the shelf supports at a different vertical position along the end panels, releasably connecting the shelf supports to the end panels, and positioning said at lest one shelf on the shelf supports. The method also includes releasably connecting at least one of said end panels to a wall of the vehicle.

In another aspect, a method is provided for adjusting the load rating of a shelf made from a polymer material. The method includes providing at least one shelf formed from a polymer material, the shelf having a bottom surface, a front wall, a back wall, and a pair of opposing side walls. The shelf further includes a plurality of slots extending upwardly from the bottom surface of the shelf and running between the side walls of the shelf. The method further includes selectively inserting a support bar within at least one of the plurality of slots in the bottom surface of the shelf. The support bars are dimensioned to fit within at least one of the plurality of shelves. The loading rating of the shelf is adjusted by removing or inserting support bars from the plurality of slots.

In another aspect, an adjustable storage unit for a vehicle is provided including a pair of opposing end panels. Each end panel has an outer surface, an inner surface, a rear edge, a front edge, a vertical row of apertures adjacent the rear edge, and a vertical row of apertures adjacent the front edge. At least one pair of opposing shelf supports are releasably connected to the inner surface of the opposed end panels, each shelf support including opposite ends defining a retaining clip, wherein each end of the shelf support is connected to the respective end panel at one of the apertures. At least one shelf is disposed between the end panels. The shelf includes a rear edge, a front edge, a pair of side edges, and connection means positioned proximate each corner of the shelf for releasably coupling the shelf to the retaining clips of the opposed shelf supports. The shelf is movable between a first position, in which the shelf supports support the shelf to define a substantially horizontal plane, and a second position, in which some of the connection means are released from the retaining clips and the shelf is pivoted about one of the rear or front edges.

In yet another aspect, the invention provides an adjustable storage unit for a vehicle including a pair of opposing end panels. Each end panel includes an outer surface, an inner surface, a rear edge, a front edge, and defining a vertical row of apertures adjacent the rear edge, and a vertical row of apertures adjacent the front edge. At least one pair of opposing shelf supports are configured to be releasably connected to the inner surface of the end panels and at least one shelf formed of a polymer material is configured to be releasably connected to the pair of opposing shelf supports.

Other aspects of the invention will become apparent by consideration of the detailed description and accompanying drawings.

BRIEF DESCRIPTION OF THE DRAWINGS

FIG. 9 is an enlarged front elevational view of the drawer system in FIG. 8.

FIG. 9A is an enlarged view of a portion of an end drawer mounting system of FIG. 9.

FIG. 9B is an enlarged view of the bottom portion of the center drawer mounting system in FIG. 9.

FIG. 9C is an enlarged view of the upper portion of the center drawer mounting system in FIG. 9.

FIG. 18 is a cross-sectional view of the shelf taken along line 18-18 of FIG. 16B.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1B:
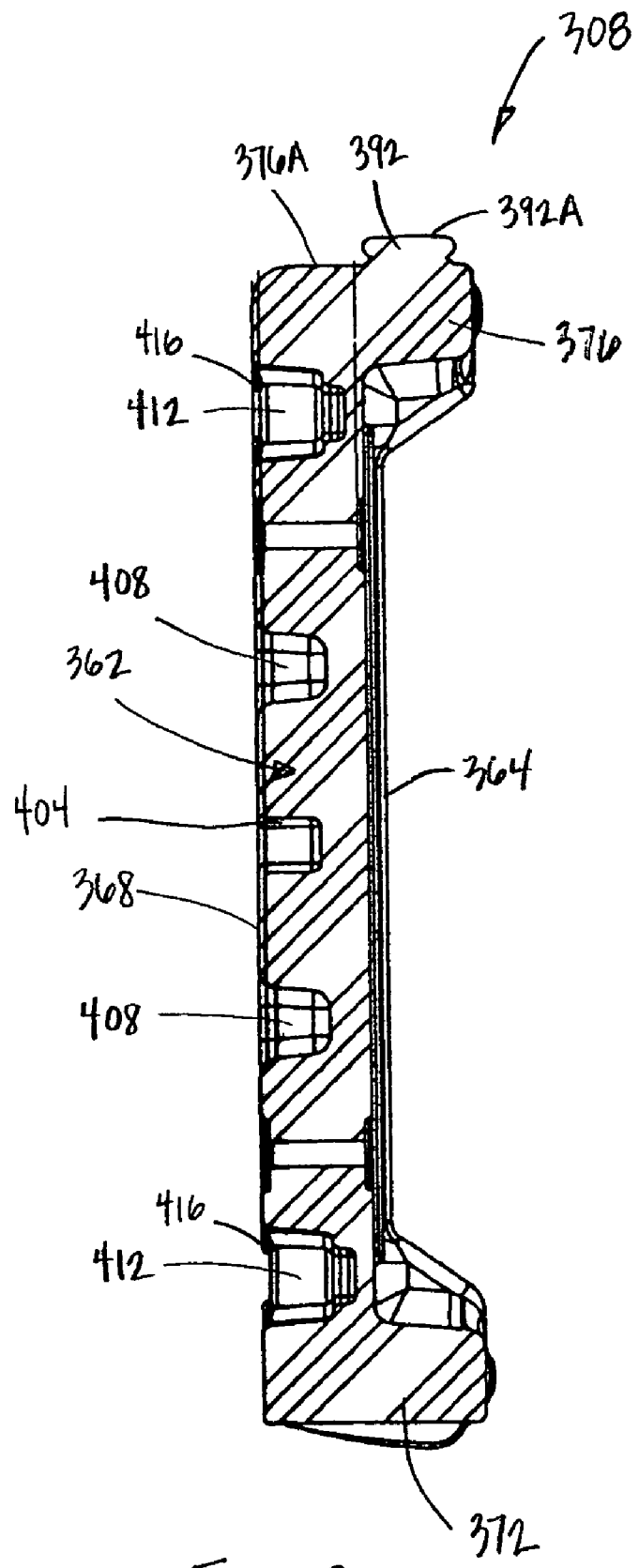
FIG. 1 is a perspective of the cargo bay of a vehicle containing storage units according to one embodiment of the invention with one set of units swung away from its normal position for clarity.

With reference to FIG. 1, a vehicle 10, such as a van, includes a cargo bay 12 and storage units 14, 16, 18, 20, and 22 of the invention. The storage units are secured within the vehicle by connecting the units to a wall, e.g., wall 24, of the vehicle via attachment bracket 26, which is releasably fastened to a portion of a given storage unit. Only one attachment bracket 26 is shown in FIG. 1, but each storage unit may be individually fastened to a wall of the vehicle by more than one bracket. Further, each storage unit may be connected to the wall by attachment brackets on each end of the unit. In preferred embodiments, the units are also fastened to the floor of the vehicle. The storage units of the invention are now described in more detail.

With reference to FIGS. 2-6, storage unit 14 according to the invention is shown. Generally, storage unit 14 includes a pair of opposing end panels 28 with a plurality of shelves 72 removably disposed between the end panels. End panels 28 are connected by one or more connecting members such as, for example, back panels 44 and 46 and/or front connecting member 96.

End panels 28 are preferably mirror images of one another. Thus, unless otherwise stated, references made to one end panel are also intended to describe the other, opposing panel. However, end panels are sometimes altered to accommodate mounting in a particular vehicle or storage needs. A pair of end panels, therefore, may not always be a mirror image of one another. End panels 28 include an inner surface 30, an outer surface 32, a front edge 34, and a rear edge 36. The front edge 34 is substantially vertical over the entire height of the end panel. The rear edge 36 includes a substantially vertical portion 36a and an upper angled portion 36b toward the top of the panel. The angled portion 36b is angled away from the vertical plane of vertical portion 36a and toward the front edge of the panel. In preferred embodiments, the end panels include an angled portion, e.g., 36b, to more closely conform to the shape of the vehicle wall, which may taper or slightly round towards the roof of the vehicle. Thus, the use of back panels with an angled upper portion allows a user to better fit and position a storage unit of the invention within the van. This creates more storage space within the cargo area of the vehicle. However, storage units of the invention need not include an angled portion such as 36b, and the present invention contemplates storage units wherein the rear edge of the end panels is substantially vertical over the entire height of the panels.

Figure 2:
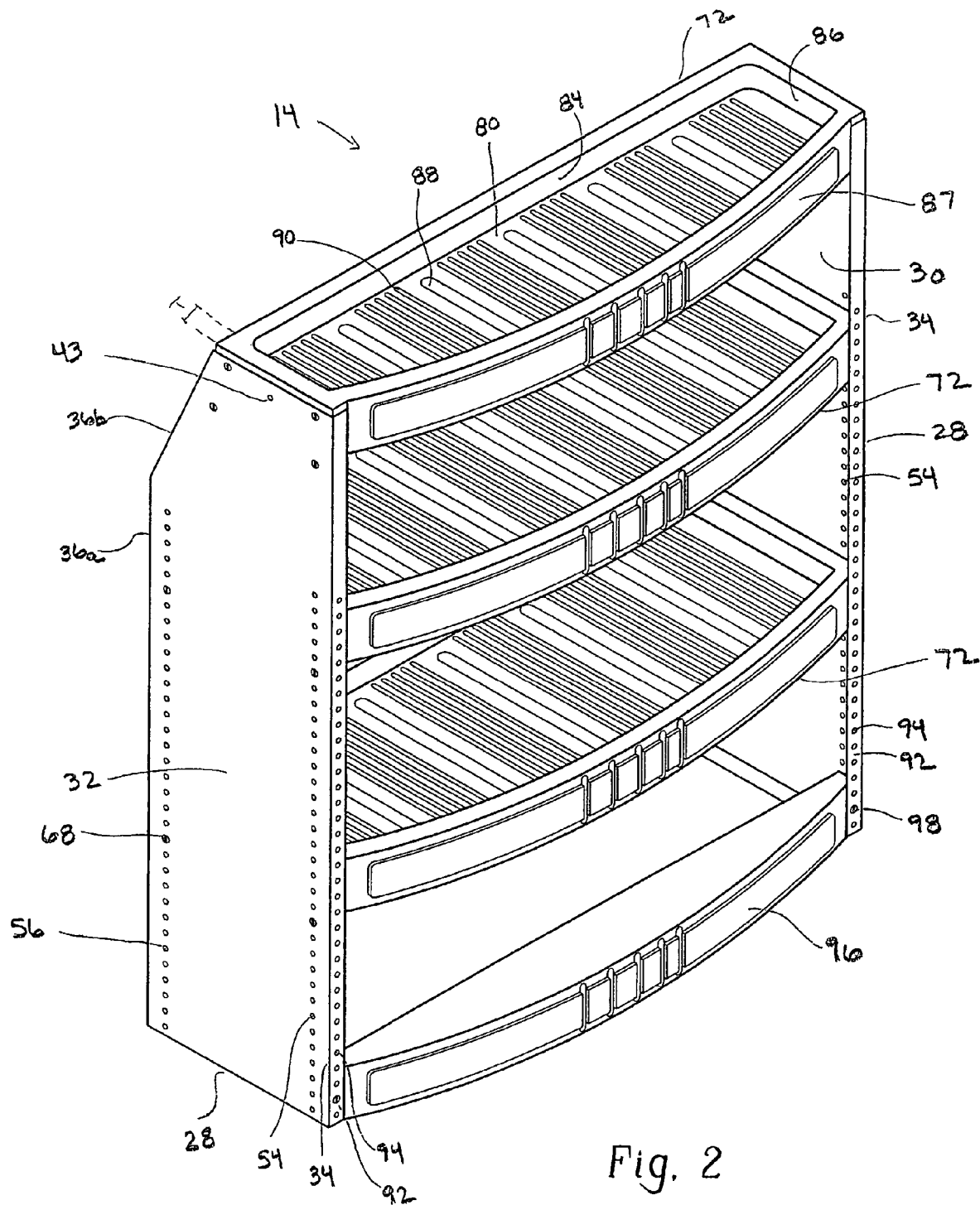
FIG. 2 is a perspective of one embodiment of a storage unit according to the invention.
Figure 3:
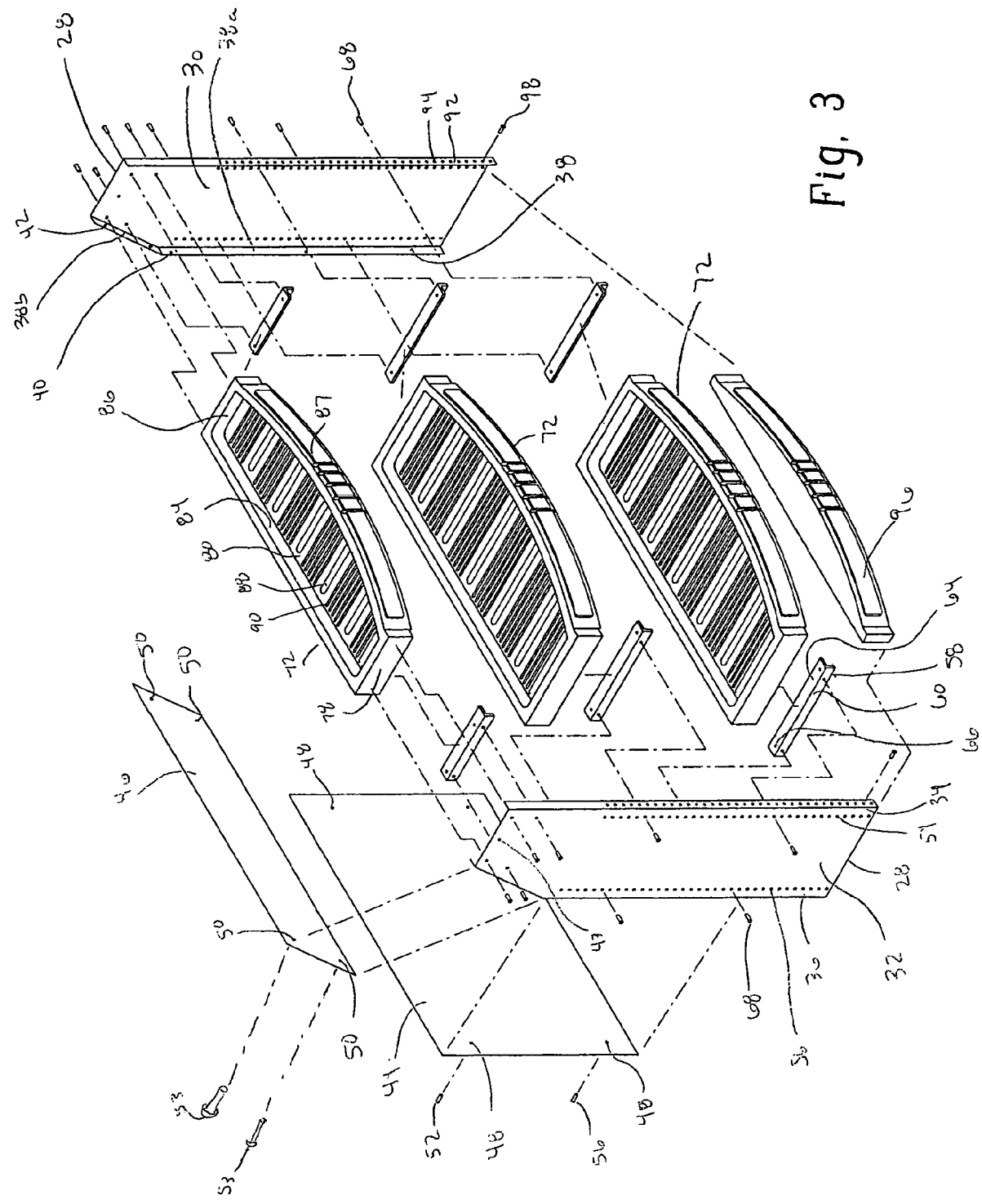
FIG. 3 is an exploded view of the storage unit in FIG. 2.
Figure 4:
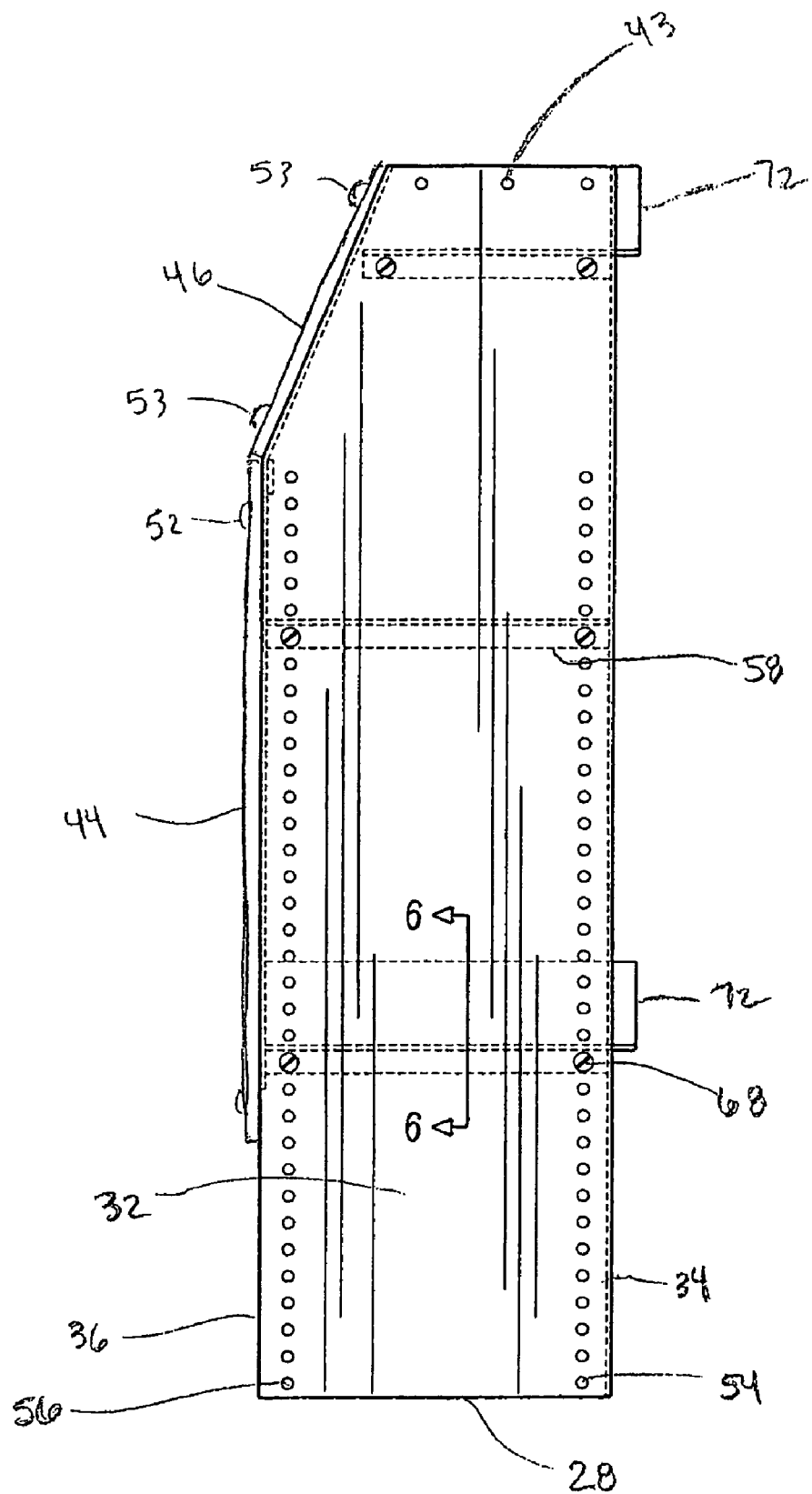
FIG. 4 is a side elevational view of the storage unit in FIG. 2 with a shelf removed.

End panels 28 are connected to each other along the rear edges of the panels by connecting members, such as back panels 44 and 46. In the embodiment in FIGS. 2-6, end panels 28 each include a rear flange 38 integral with and substantially perpendicular to the surface of the end panels. Preferably rear flanges 38 are oriented in a direction toward the opposing end panel, i.e., toward what will be the interior of the storage unit. In the embodiment in FIGS. 2-6, each rear flange 38 also includes a vertical portion 38a and an angled portion 38b that extend from and are integral with the vertical and angled portions of the rear edges respectively. Each rear flange 38 includes a plurality of apertures 40 in a vertical portion 38a and a plurality of apertures 42 in angled portion 38b. Back panel 44 connects end panels 28 along the vertical portion of the rear of the end panels, and back panel 46 connects the angled portion of the rear of the end panels. Each of back panels 44 and 46 include a plurality of apertures 48 and 50 respectively that register with the apertures 40 and 42 respectively of rear flanges 38. The back panels are connected to the end panels by fasteners 52 and 53, which are inserted through the apertures of the back panels and rear flanges. Any fastener known in the art may be used to secure the connecting member(s), e.g., back panels 44 and 46, to the end panels. Examples of suitable fasteners include screws, bolts, rivets, pins and the like. As shown in FIG. 4, back panel 44 does not extend all the way to base of the storage unit, thus leaving an opening between the rear edges of the end panels. Such an opening may be desirable where a storage unit is positioned in a location of the vehicle where the vehicle wall includes a wheel well extending inwardly from the vehicle wall. Thus, the opening can accommodate the wheel well, and the storage unit can still be placed as near to the vehicle wall as desired. Units that are positioned in areas where the wheel well would interfere with the rear of the unit may include a back panel adjacent the base of the storage unit.

Back panels 44 and 46 are merely exemplary of suitable connecting members to connect the end panels. Any suitable structure or configuration may be used to connect the end panels. Additionally, the connecting members need not be panels per se. That is the width of the connecting member may be any width suitable to provide a connection point, e.g., a thin bar. Further, any number of connecting members may be used as desired by the end user.

The end panels may also be connected along the front edge by a connecting member such as, for example, front panel 96. Front panel 96 is connected to end panels 28 along the base of each front edge 34 of end panels 28. The embodiment in FIGS. 2-6 includes a front panel connected to front flanges 92 by fastener(s) 98 through apertures 94. The end panels joined together by the connecting members (along the rear edge of the panel and/or the front edge of the panels) forms a frame system. Preferably, if a connecting member is employed along the front edges of the panels, such connecting member will be connected to the end panels along the base of the units and minimize any potential loss of storage space. A front connecting member, such as front panel 96, may be any configuration including, for example, a molded curved member such as front panel 96, or a planar box or plate of either a metal or plastic construction. The configuration of the front support member may be selected as desired for a particular vehicle, intended use, or for economic or aesthetic reasons.

Figure 6:
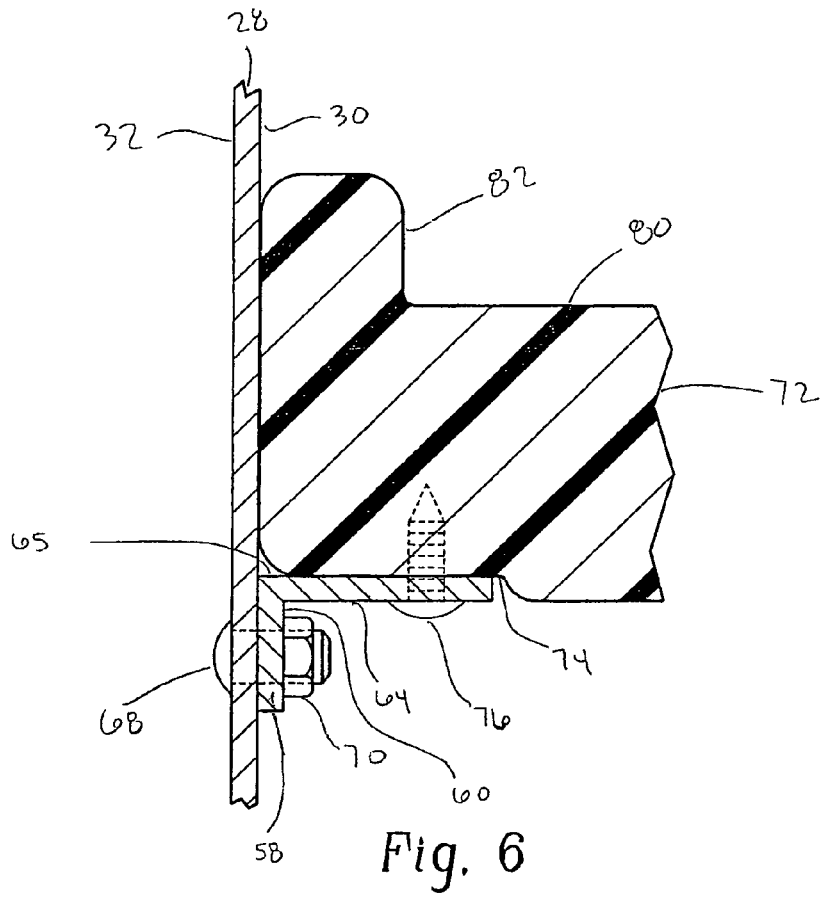
FIG. 6 is an enlarged partial view of a shelf supported in the storage unit of FIG. 1 taken along line 6-6 of FIG. 4.

Storage unit 14 contains a plurality of shelves 72 disposed between end panels 28, i.e., disposed within the frame system. End panels 28 include a first vertical row of apertures 56 nearer to the rear edge (relative to the front edge), and a second vertical row of apertures 54 nearer to the front edge (relative to the rear edge). Preferably, the vertical rows of apertures are parallel to one another and positioned opposite one another so that opposing apertures within a given end panel lie in the same horizontal plane. Additionally, it is preferred that a given aperture in one panel have a corresponding aperture in the opposing end panel so that corresponding apertures in opposing end panels lie in the same horizontal plane. The number and location of the apertures is not limited and may be chosen to accommodate a particular vehicle or intended use. Shelves 72 are supported within the unit by shelf supports 58. Shelf supports 58 include a vertical portion 60 running parallel to the inner surface 30 of the end panels, and a flange 64 substantially perpendicular to and integral with vertical portion 60. Flange 64 has a top surface that defines a substantially horizontal surface. Shelf supports 58 are releasably connected to the end panels, and particularly inner surface 30 of the end panels, by fasteners 68, which are inserted through opposing apertures in the first and second vertical rows 56 and 54 and through corresponding apertures 68 positioned in vertical portion 60 of shelf support 58. The shelf supports in all units, or within an individual unit may be identical. As shown in FIG. 6, fastener 68 may be secured by nut 70. Any fastener suitable for holding shelf supports 58 in position may be used provided the fastener is removable from the apertures. The shelf supports are not connected to the unit through the back panels or rear flanges of the end panels.

Figure 5:
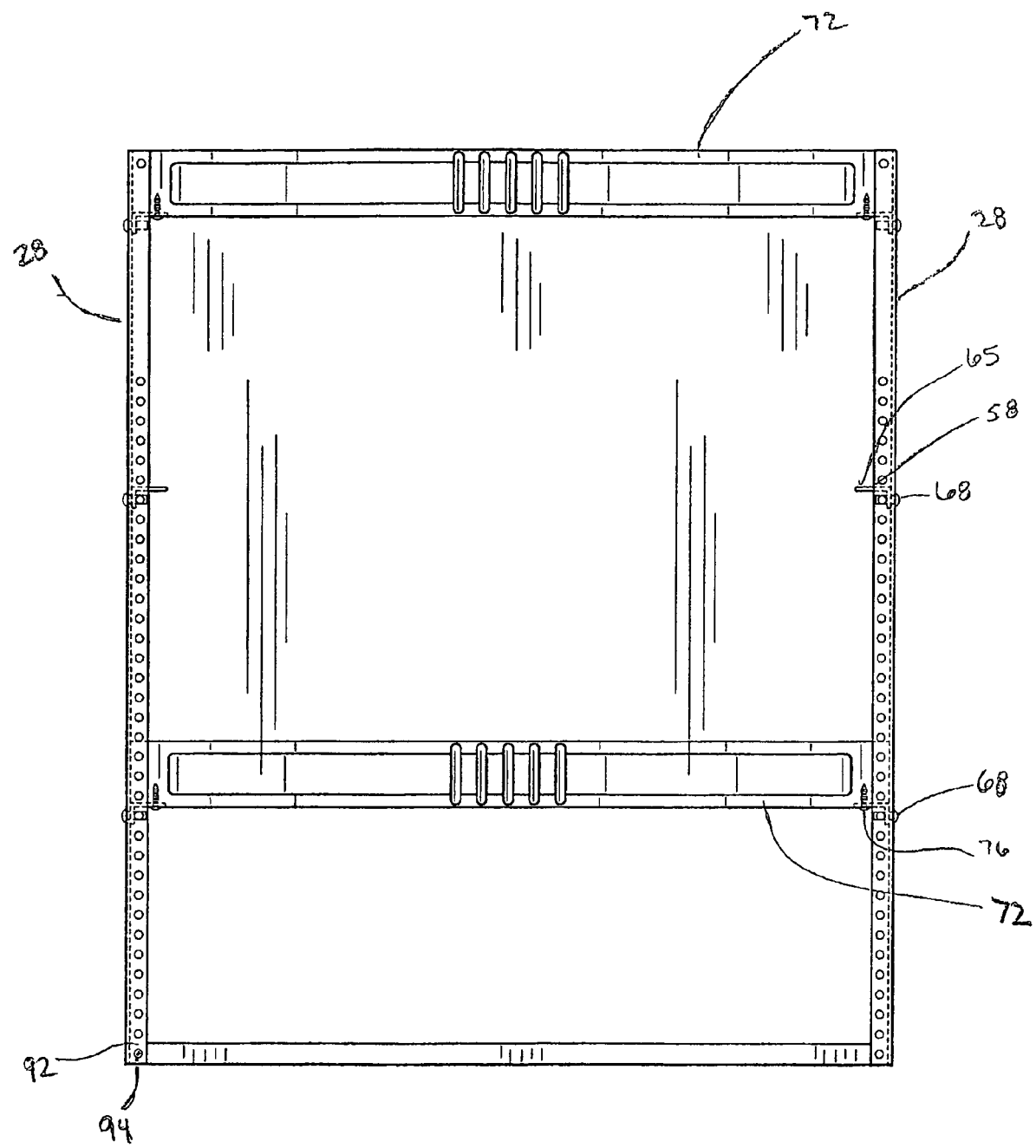
FIG. 5 is a front elevational view of the storage unit in FIG. 2 with a shelf removed.

A plurality of shelves 72 are disposed between end panels 28. Shelves 72 include a bottom surface 74 and outer vertical walls 78. The shelf is positioned between the end panels, i.e., within the frame system, such that bottom surface 74 rests on the top surface 65 of shelf supports 58. In preferred embodiments, shelves 72 have a width just slightly less than the distance between the inner surfaces of opposing end panels 28 so that outer vertical walls 78 of the shelves contact respective inner surfaces 30 of the end panels to provide a snug fit in the frame system. The outer walls may also be configured with protrusions or other configurations capable of engaging the inner surface of the end panels. Optionally, and as shown in FIGS. 3, 5 and 6, shelves 72 may also be secured to shelf support 58 by fastener 76 inserted through apertures 66, which are located in horizontal flanges 64 of shelf supports 58. Fasteners 76 are preferably threaded fasteners inserted directly into bottom surface 74 of the shelf, or through a corresponding threaded bore (not shown) located in the bottom surface of the shelf and adapted to receive the fastener.

Shelves 72 have opposing side walls, a rear wall, a front wall and a large horizontal area 80 with a top surface and a bottom surface. The bottom surface may be offset upwardly relative to the bottom edge of the shelf walls. The top surface of the large horizontal area is offset downwardly from the upper surface of the shelf walls such that the shelf walls preferably have inner surfaces, e.g., 82 and 86. The height of the shelf outer walls and/or the height of the inner surfaces of the wall, i.e., the distance from the shelf tray, (e.g., 80) to the top surface of the shelf walls, may be selected as desired for a particular vehicle or intended use. Each wall defines a thickness T that may also be selected as desired by for a particular vehicle or intended use. The depth of the shelf from the upper surface of the walls to the top surface of the horizontal area provides extra storage area. Having a bottom surface of the horizontal area offset upwardly relative to the bottom edge of the shelf walls provides more space in between successive shelves by increasing the distance between the top surface of the horizontal area of a first shelf and the bottom surface of the horizontal area of a second shelf positioned above the first shelf. Shelves 72 may be configured in any shape as desired for a particular vehicle or intended use.

As shown in the embodiment in FIGS. 2-6, the shelf is integral. The horizontal area 80 and the walls are formed as a single plastic body. The inner surfaces of the walls and the top surface of the horizontal area form a shelf tray. Additionally, the upper surface and/or bottom surface of the horizontal area of the shelves may be configured as desired for a particular vehicle or intended use. For example, the upper and./or bottom surfaces of the large horizontal area of the shelves may include ribs, grooves, and/or other shapes or configurations for structural support and/or to increase the friction of the tray. In the embodiment in FIGS. 2-6, shelves 72 include grooves or depressions 88 and protrusions 90 in the top surface of the horizontal surface area of the shelves. Protrusions 90 are in the shape of elongated ribs running from adjacent the rear wall toward the front wall of the shelves (or vice versa). The depressions and/or protrusions in the shelves may be configured in any size or shape as desired and are not limited to any particular size and/or number.

Additionally, the shape of the shelves is generally not limited in any manner. As seen in the embodiment in FIGS. 2-6, front wall 87 is bowed out and extends beyond the vertical plane defined by the front edges of the end panels. The front wall or other walls may have different configurations as desired for a particular vehicle or intended use. Additionally, while the embodiment in FIGS. 2-6 have shelves of similar shapes and sizes, shelves of different shapes and configurations may be used within a single unit as required for a particular vehicle or intended use.

Figure 7:
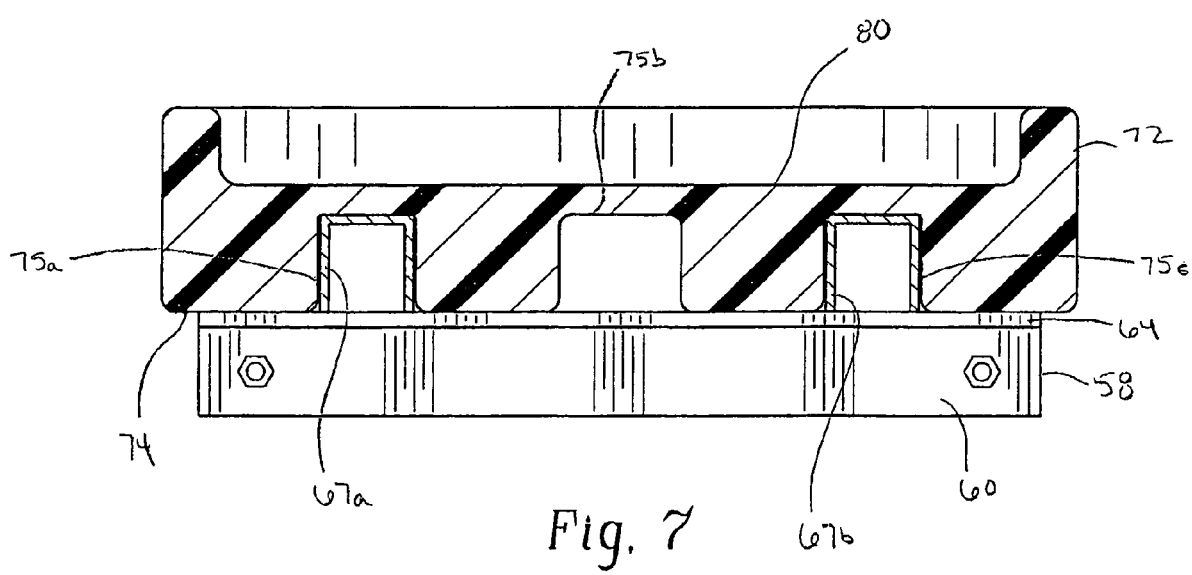
FIG. 7 is a side cross-sectional view of a shelf showing another embodiment for providing additional support to the shelves within the storage units.

With reference to FIG. 7, an alternative embodiment that provides additional support to shelves within storage units of the invention is shown. Shelves used in storage units of the invention are formed from polymer materials such as, for example, plastics or composite materials. Because the size of the storage units is not limited and may be any length as desired for a particular vehicle or intended use, the shelves may have widths of several feet or greater. Depending on the thickness of the shelf walls and horizontal support areas, along with the strength of the particular polymer plastic used to form the shelf, shelves several feet long may not be able to withstand a particular load. As shown in FIG. 7, additional supports may be used to provide additional support to a shelf within a storage unit. Specifically, FIG. 7 shows a shelf 72 having a bottom surface 75 supported by horizontal flange 64 of shelf support 58. U-shaped bars 67a and 67b rest on flange 64 of shelf supports 58. That is, an end of a bar rests on opposing shelf supports. Shelf 72 further includes slots 75a, 75b, and 75c offset upwardly from bottom surface 74. Slots 75a, 75b, and 75c run along the width of the shelf, i.e., between the side walls of the shelf. As shown in FIG. 7, slot 75a and 75c are dimensioned to mate with and surround three sides of the U-shaped bars 67a and 67b respectively. Preferably, bars 67a and 67b snap into slots 75a and 75c respectively and fit snugly therein. Alternatively, the support bars may be positioned into the slots on the bottom surface of the shelf prior to positioning the shelf on a shelf support. Preferably, the support bars are dimensioned so that the lower (exposed) ends of the legs of the U-shaped bar is substantially coplanar with the bottom surface of the shelf such that the support bar will contact the upper surface of a shelf support. The support bars may also be dimensioned so that the lower ends of the legs of the U-shaped bar are not coplanar with the bottom surface of the shelf but slightly recessed. In that case, the bar would not contact the upper surface of the shelf support. The u-shaped bars, such as bar 67a and 67b, provide further support across the width of the shelf so that the shelf is able to support a greater load. Bars or beams having different cross-sectional shapes, such as a hollow square or rectangle can also be used.

The use of support bars positioned in widthwise slots of a shelf provides a method for adjusting the load rating of a shelf. Specifically, a shelf that is not further supported by support bars, such as U-shaped bar 67a and 67b, has a first load rating. A shelf that is supported along the width of the shelf by one bar has second load rating, and so forth. Thus, a shelf may have N+1 load ratings were N is the number of widthwise slots in the shelf bottom surface to accommodate bars such as, for example, bars 67a and 67b. The load rating may, therefore, be adjusted by either adding or removing bars as needed for the intended use. Thus, for example, in FIG. 7, shelf 72 would have four load ratings, i.e., one load rating without any of the support bars 67a or 67b, and three additional load ratings depending on whether one, two or three bars are positioned within slots 75a, 75b, or 75c. There is no limit as to the number of widthwise slots that a shelf may have (on the bottom surface).

The support bars 67a and 67b are not limited in any manner. The support bars may be configured in any shape and made from any material to provide the desired support for a particular use. For example, the support bars may be made from steel or extruded aluminum or a fiber reinforced composite. Alternatively, the support bars may be molded inside the shelves. That is, the bars may be encapsulated within a shelf. While encapsulating support bars in the shelves may increase the load rating of a particular shelf, encapsulating the support bars within the shelf does not allow for the load rating of a shelf to be adjusted.

Figure 8:
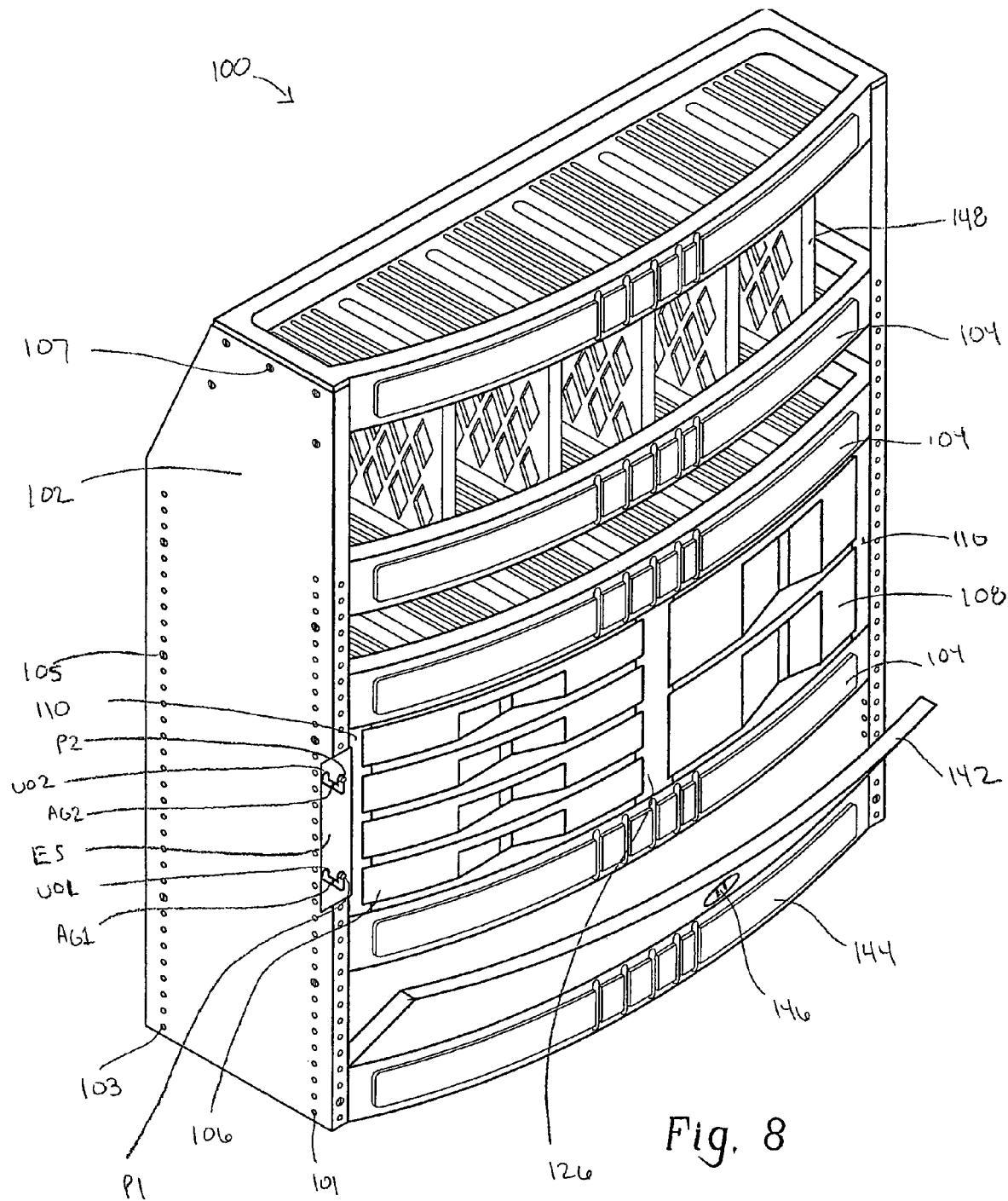
FIG. 8 is a perspective view of another embodiment of a storage unit according to the invention.

With reference to FIGS. 8 and 9 (including 9A-9C), storage unit 100 is shown. Storage unit 100 is similar to storage unit 14 described above in that storage unit 100 includes a frame with opposing end panels 102 connected by a connecting member (not shown). A plurality of shelves 104 are disposed between the end panels 102, i.e., within the frame, and are supported by shelf supports (not shown) that are releasably connected to an inner surface of the end panels by fasteners 105 inserted through apertures 101 and 103 in the end panels and through corresponding apertures in the shelf supports. Storage unit 100, however, includes additional features.

Storage unit 100 includes a plurality of drawers 106 and 108 disposed between end panels 102. Drawers 106 and 108 are positioned in the storage unit by drawer slides 110 and 126 (FIG. 9). Two of the thin drawer slides are positioned near the end panels and are referred to as end posts. A third drawer slide may be centrally positioned and referred to as a center post. Drawer slides 110 are end posts releasably connected to the inner surface of each end panel. Drawer slides 110 have a first wall 111a and a second wall 111b. Drawer slides 110 include apertures 112, extending through walls 111a and 111b. Apertures 112 further include an opening 114 with a diameter slightly larger than the diameter of aperture 112. Fasteners 116 are inserted through apertures 112 and through corresponding apertures in end panels 102. The head of fastener 116 is recessed in opening 114 (FIG. 9A). Alternatively, the end of the fastener may reside in slot 114 with a nut or other securing device recessed therein (FIG. 9). Drawer slide 126 is a center post positioned substantially central relative to drawer slides 110. Drawer slide 126 has a top 139, a bottom 131 and side walls 127. Bottom 131 and top 139 define one or more protrusions 132 and 140 respectively. The protrusions may be knob-like protrusions of various shapes or elongated members of various shapes. The center drawer slide 126 is positioned by inserting protrusion(s) 132 into a slot, recess, or groove 130 in the surface 128 of a shelf 124. Additionally, protrusion(s) 140 at the top of the center drawer slide 126 are inserted into slot, recess, or groove 138 in bottom surface 136 of a shelf. The protrusions are shaped to correspond to the shape of the slot, recess, or groove into which the protrusions are inserted. The protrusions are sized such that the protrusions are slightly smaller than the slot, recess, or groove so that the protrusions may be snuggly fitted into the slot, recess, or groove, such as, for example, by snapping the protrusions into the slot, recess, or groove.

Drawers 106 and 108 have outer walls 119a and 119b (FIGS. 9A, 9C) that have outer surfaces 122a and 122b and inner surfaces 120a and 120b. Drawers 106 and 108 further include flanges 124a and 124b extending from and substantially perpendicular to outer surfaces 122a and 122b respectively. As shown in FIGS. 9 and 9A-9C, flanges 124a and 124b are integral with outer surfaces 122a and 122b respectively. Inner wall 111a of drawer slide 110 has a plurality of grooves 118 that run along the width of the drawer slide. Outer walls 127 of drawer slide 126 has a plurality of grooves 134 that run along the width of drawer slide 126. Grooves 118 and 134 are adapted to receive flanges 124a and 124b respectively. Grooves 118 are preferably opposite a corresponding groove 134. That is, opposing grooves in the drawer slides 110 and 126 are preferably in the same horizontal plane so that when flanges 124a and 124b are inserted into the respective grooves, the drawer is in a substantially horizontal disposition. Drawers 106 and 108 are positioned at a location selected by the end user by positioning flanges 124a and 124b into opposing grooves 118 and 134 and sliding the flange along the surface of the grooves.

Figure 10A:
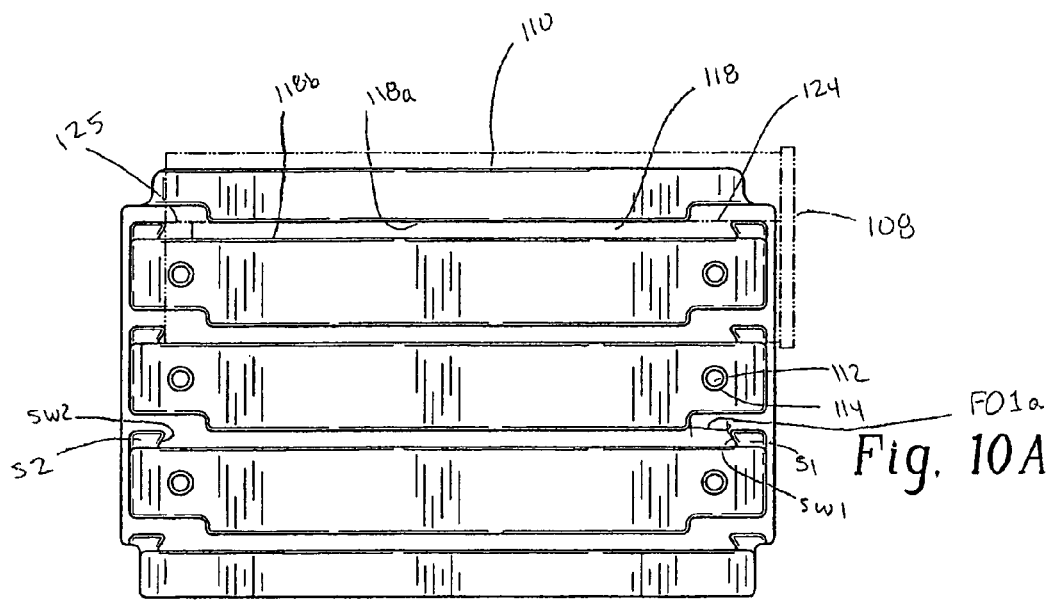
FIG. 10A is a side elevation of the inner portion of an end drawer slide in FIG. 9 showing a drawer in a closed position.
Figure 10B:
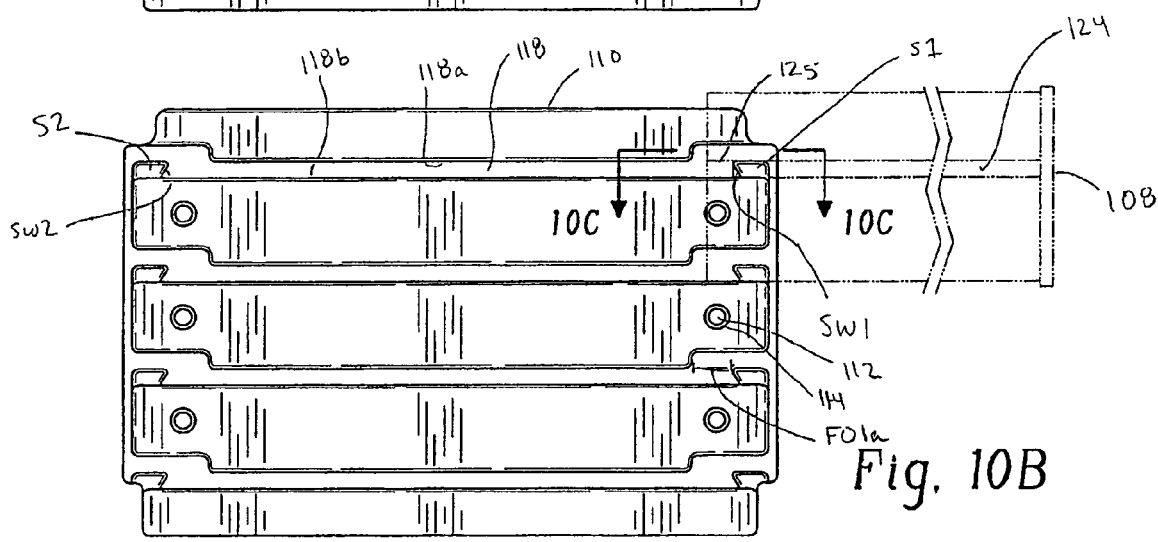
FIG. 10B is a side elevation of the inner portion of an end drawer slide in FIG. 9 showing a drawer in an opened position.
Figure 10C:
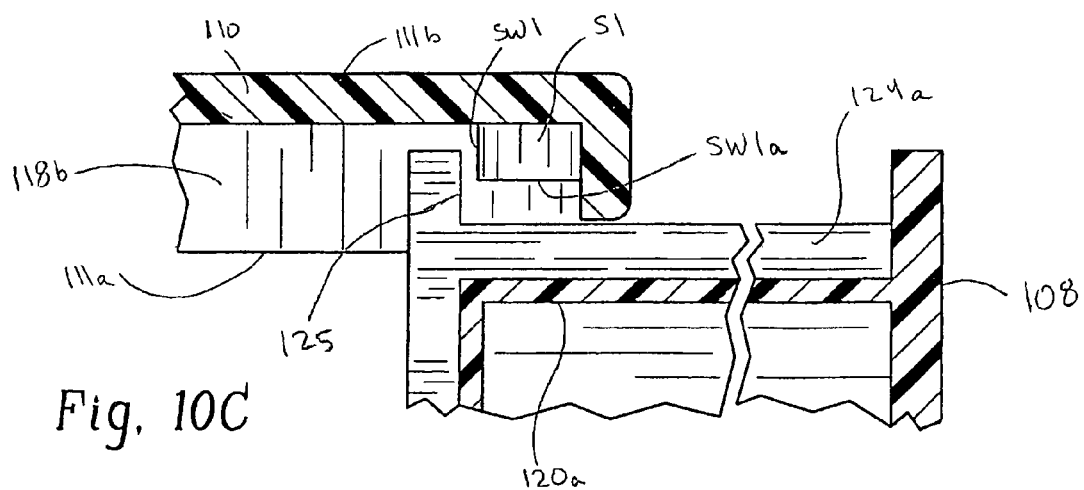
FIG. 10C is a cross-sectional top view of the drawer slide in FIGS. 10A and 10B taken along line 10C-10C.

In preferred embodiments, the drawer slides are configured to provide a stop so that the drawer may not be pulled out beyond a particular point. FIGS. 10A-10C show an end post drawer slide 110 with groove 118 defined by upper groove surface 118a and lower groove surface 118b. The discussion with respect to the end post drawer slides is applicable to center post drawer slides, which will generally have a "slide" configuration similar to the end post drawer slides. As previously described, groove 118 is adapted to receive flange 124 of a drawer, such as drawer 108. Drawer 108 is moved into an open or closed position by sliding flange 124 along lower groove surface 118b. A drawer stop S1 is provided by a stop wall SW1 integral with lower groove surface 118b that extends upwardly from the plane of lower groove surface 118b. Surface SW1a of drawer stop S1 is offset slightly from inner wall 111a of drawer slide 110, which allows flange 124 to slide along lower groove surface 118b. Generally, a drawer will include a protrusion or projection, such as, for example, flange 125, along the rear portion of the shelf. As shown in FIG. 9C, flange 125 is integral with flange 124. As shown in FIG. 9C, drawer 108 slides along lower wall 118b in direction D1 until flange 125 contacts or engages stop wall SW1. Optionally, the drawer slides may also include a rear stop, such as, for example, rear stop S2, having stop wall SW2.

To position the drawers in the drawer slides, the rear portion of the drawer and flange 125 are moved into front opening FO1 until flange 125 can fit into the opening FO1a, which is defined by the distance between the edge 118c of upper groove surface 118a and the edge of stop wall SW1. Flange 125 is then lowered through opening FO1a until flange 125 and 124 contact lower wall 118b. At that point, the drawer, such as drawer 108, may be slid into an open or closed position as desired.

The drawers and/or drawer slides are not limited to any shapes or sizes, and may be configured for a particular vehicle or intended use. Drawer stops, e.g., S1b (FIGS. 10A-10C)

need not have angled walls as depicted in FIGS. 10A-10C, but may have any configuration that will sufficiently engage a portion of a drawer to prevent the drawer from opening or closing further. Additionally, a center post drawer slide need not be utilized. Rather, in embodiments drawers may be positioned using only opposing end post drawer slides, and the drawers may be substantially the entire width of a storage unit. Alternatively, one or more center post drawer slides may be positioned between opposing end posts to provide more than two columns of drawers. There is no limit to the configuration or permutations, and the embodiment in FIGS. 8-10 is merely exemplary of one possible embodiment.

Figure 8A:
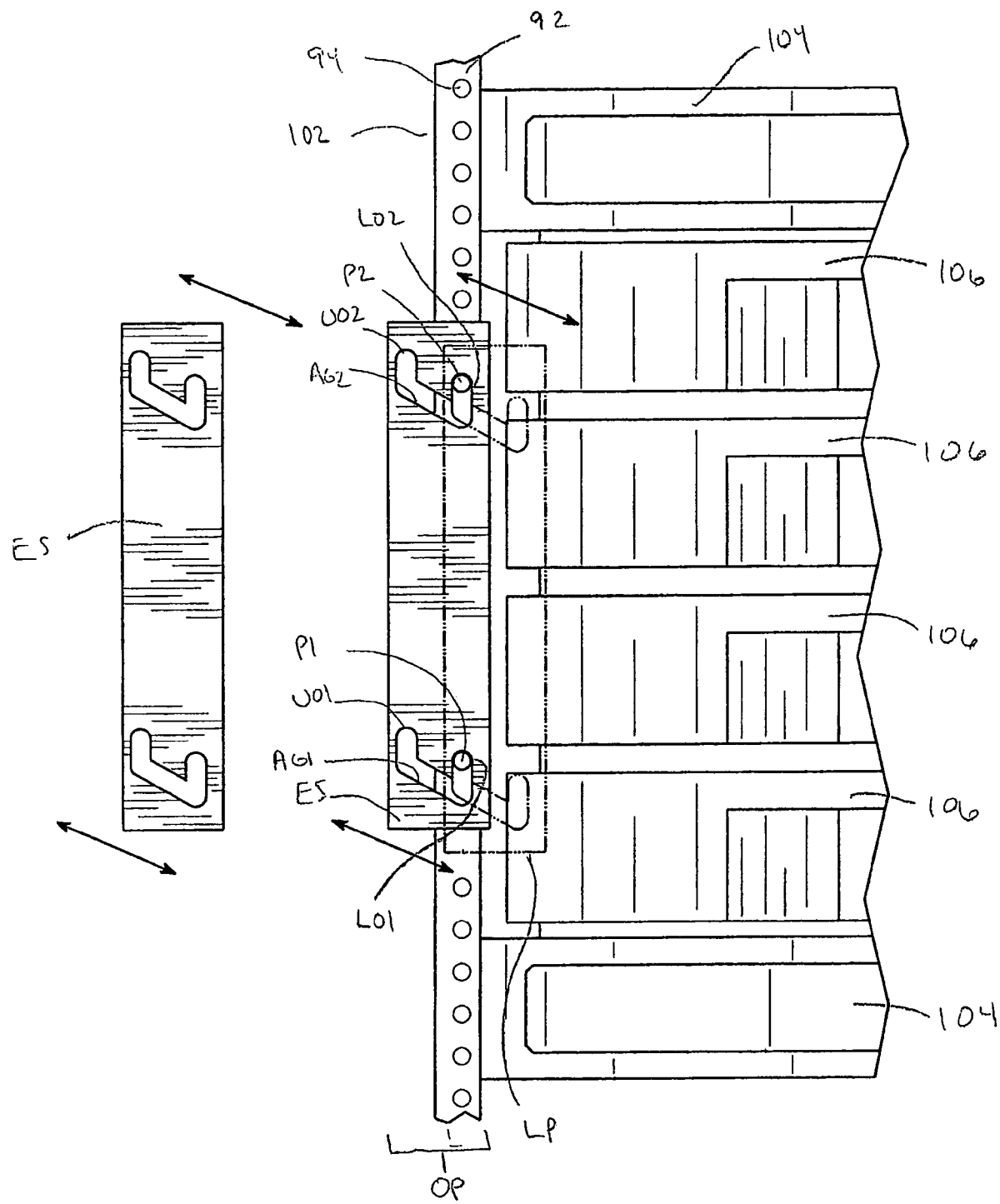
FIG. 8A is an enlarged view of a portion of the storage unit in FIG. 8 showing a portion of the drawer units with an external drawer stop.

As shown in FIG. 8A, storage units of the invention may also include an external drawer stop such as, for example, external stop ES. External stop ES is generally a planar object, such as a plate, which is adapted so that a portion of the plate overlaps a portion of the drawers to prevent the drawers from opening. A shown in FIG. 8A, external drawer stop ES includes a pair of angled grooves AG1 and AG2. Angle grooves AG1 and AG2 include upper offsets UO1 and UO2 respectively, and lower offsets LO1 and LO2 respectively. The offsets are adapted to engage a pin or similar object extending from apertures 94 of front flange 92. In a preferred embodiment the plate is attached to the end panel using a shoulder height rivet, which allows for a fixed position and is toleranced to allow the plate to move freely. The plate or external stop ES may be moved from an open position OP by disengaging the lower offsets from pins P1 and P2, and sliding the stop along angled grooves AG1 and AG2 until pins P1 and P2 engage upper offsets UO1 and UO2 respectively. External stop ES is now positioned in a locked position LP such that a portion of external stop ES overlaps a portion of the ends of the drawers, such as drawers 106. When in locked position LP, external stop ES locks or retains the drawers into a closed position. Preferably, the offset grooves are a little under tolerance to allow a tight snap fit for the locked in position in either the open position or the locked position.

Storage unit 100 also includes a door 142 hingedly connected to base plate 146 so that door 142 opens by rotating about a horizontal axis near the bottom of the door. A hinge (not shown) is releasably connected to the base plate through apertures in the base plate and corresponding apertures in the hinge. Alternatively, the door may be hingedly connected to the unit such that the door opens horizontally. In such an embodiment, the hinge would be releasably connected to the front edge of an end panel. Door 142 may include latch assembly 146 to enable the user to lock the door into the closed position. A preferred latch assembly is described more fully herein.

Storage unit 100 also includes dividers 148 positioned in a shelf 104 to provide separate storage compartments within a shelf. Dividers 148 may be held in place in a manner similar to that used to position drawer slide 126. That is, dividers 148 have a bottom portion with a bottom surface that may include a plurality of protrusions adapted to fit into corresponding recesses of the shelf tray. For example, a protrusion may be a longitudinal oval shaped protrusion adapted to fit in a slot in the shelf tray. Alternatively, the bottom portion of the divider may further have an upper surface and a plurality of apertures extending through the top and bottom surfaces of the dividers bottom portion. Fasteners may then be fitted through the apertures and directly into either the tray of the shelf or a corresponding aperture or bore located in the shelf tray.

Figure 11:
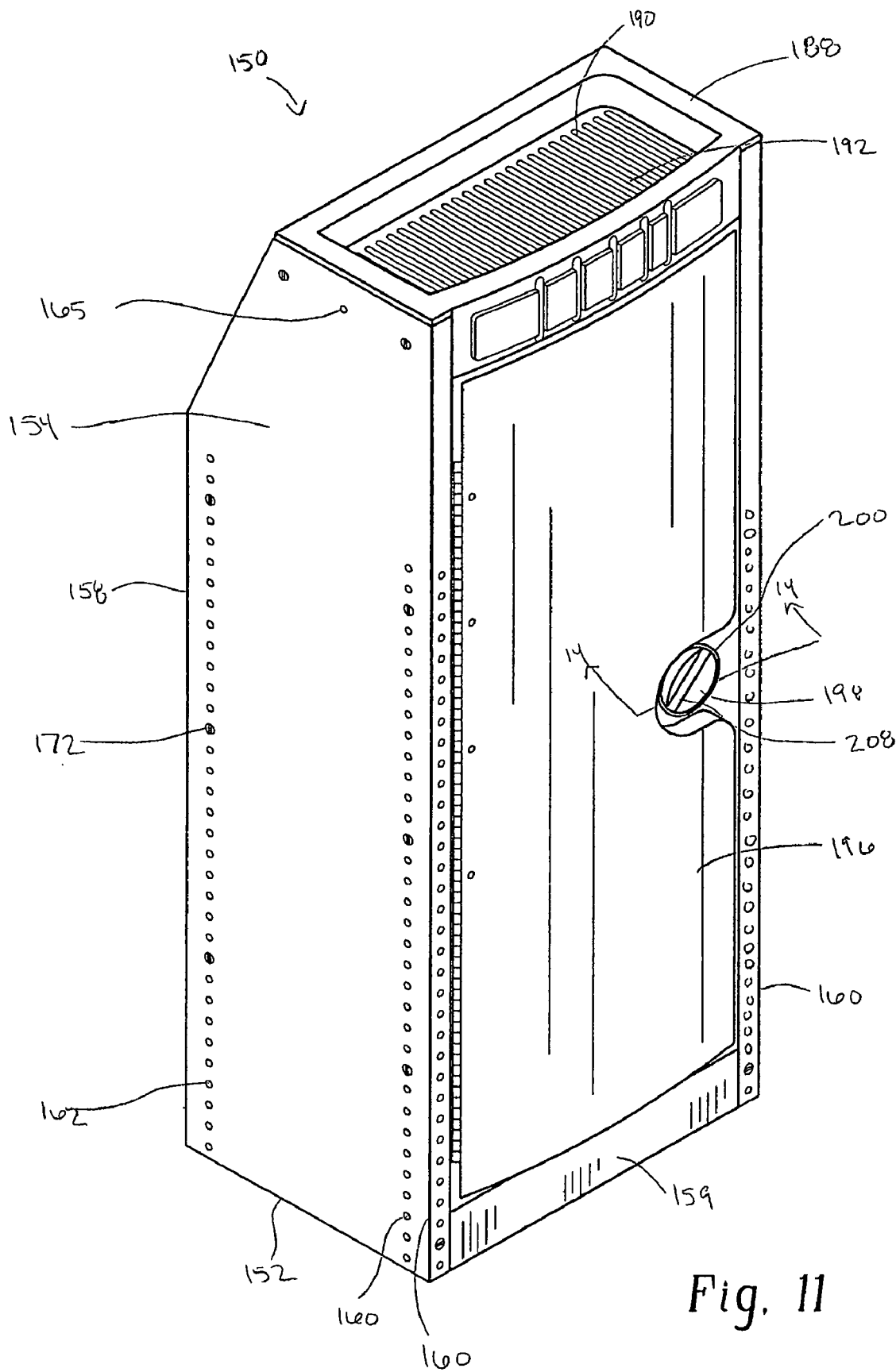
FIG. 11 is a perspective view of another embodiment of a storage unit according to the invention.
Figure 12:
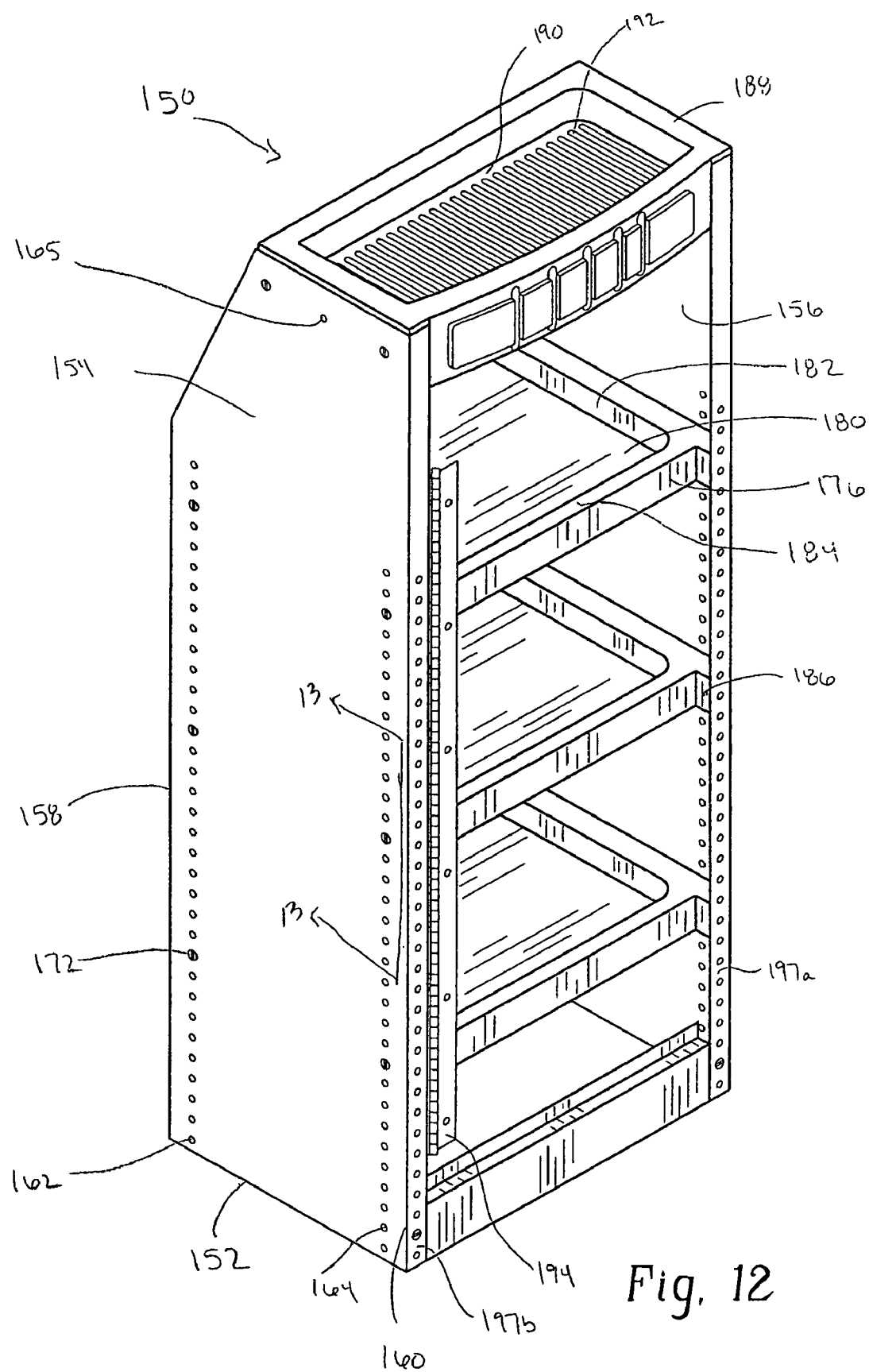
FIG. 12 is a perspective view of the embodiment in FIG. 11 with the door removed.
Figure 13:
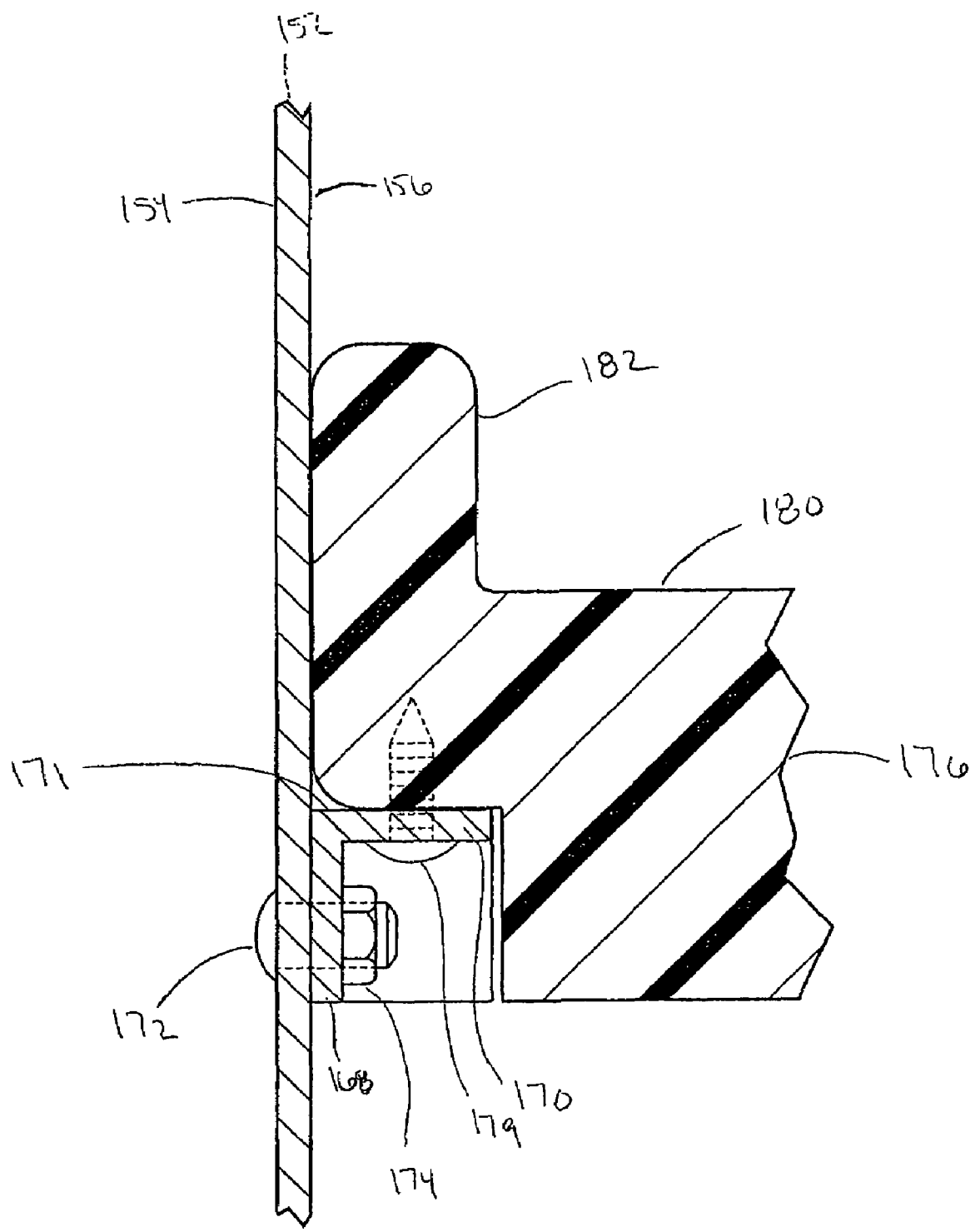
FIG. 13 is an enlarged front elevational view of a shelf supported in the storage unit of FIGS. 11 and 12 taken along line 13-13 of FIG. 12.

With reference to FIGS. 11-13, storage unit 150 is shown. Storage unit 150 is a locker assembly. Locker assembly 150 includes end panels 152 having an outer surface 154, an inner surface 156, a rear edge 158 and a front edge 160. End panels 152 are connected by one or more connecting members (not shown) along the rear edges 158 and a front connecting member 159 connected along the front edges 160 of the panels. Similar to the embodiment in FIGS. 2-6, locker assembly 150 may include rear flanges perpendicular to the surfaces of the end panels and directed toward the interior of the unit. The rear flanges may include a plurality of apertures, and the connecting members may be releasably connected to the end panels through the apertures of the rear flanges. End panels 152 include a first vertical row of apertures 162 nearer to the rear edge (relative to the front edge) and a second vertical row of apertures 164 nearer to the front edge (relative to the rear edge). Shelf supports 166 are releasably connected to the inner surface 156 of end panels 152 by fasteners 172, which are inserted through apertures in the first and second vertical row of apertures 162 and 164 and through corresponding apertures in vertical member 168 of shelf support 166. Fasteners 172 may be secured in place by nuts 174. Shelf supports 166 include flange 170 substantially perpendicular to and integral with vertical member 168. Flange 170 includes an upper surface 171.

One or more shelves 176 are positioned between end panels 152, i.e., disposed within the frame system formed by connecting the end panels via the connecting members. Shelves 176 are positioned between the end panels by resting bottom surface 178 of the shelves onto the upper surface 171 of shelf support 166. Fasteners 179 may be used to further secure the shelves to the shelf supports. Fasteners 179 may be inserted through apertures in flange 170 and either directly into the bottom of the shelf or into a threaded bore (not shown) adapted to receive such a fastener.

Shelves 176 have two side walls 182, a rear wall (not shown) and front wall 184. Shelves 176 further include a horizontal tray surface 180 recessed from the upper surface of the walls. Thus, the walls include an inner surface perpendicular to tray 180. Shelves 176 east include two flanges 186 adjacent to and extending from front wall 184 one at either end of the front wall. The outside surfaces of the flanges 186 are coplanar with the outside surfaces of the side walls 182. Flange 186 preferably extends to or almost to the front edge of an end panel 152. Thus, front wall 184 of shelf 176 is recessed relative to the front edge of the end panels. This allows for the front edge of the end panels to accommodate a door 196, which is hingedly connected to an end panel while providing out side surfaces engaging almost the full depth of the end panels 152. Hinge 194 is releasably connected to a front flange 197 that extends substantially perpendicular to and is integral with a front edge of the panel. Each end panel may include a front flange. As shown in FIG. 11, flanges 186 of shelves 176 are located between the front walls of the shelves and an inner surface of front flange 179a. Preferably, the width of (shelf) flange 186 is not greater than the width of (panel) flange 179. Alternatively, the shelves 176 need not include flange 186. The shelves in locker assembly 150 should be sized, however, so that there is a space between the front edge of the end panels and the front wall of the shelves to provide clearance for a door.

Locker assembly 150 may also include an upper shelf 188, with a top horizontal surface 190 offset downwardly relative to the upper surface of the shelf walls and a plurality of grooves or protrusions in the surface of the tray. Generally, the upper most shelf in storage units according to the invention are positioned on shelf supports in the same manner as other shelves in the unit. That is, the upper shelf may be supported by shelf supports that are mounted through apertures in the end panels. Alternatively, or in addition to being supported by shelf supports, the upper most shelf may be positioned by fasteners inserted directly into the side walls of the shelf.

Figure 14:
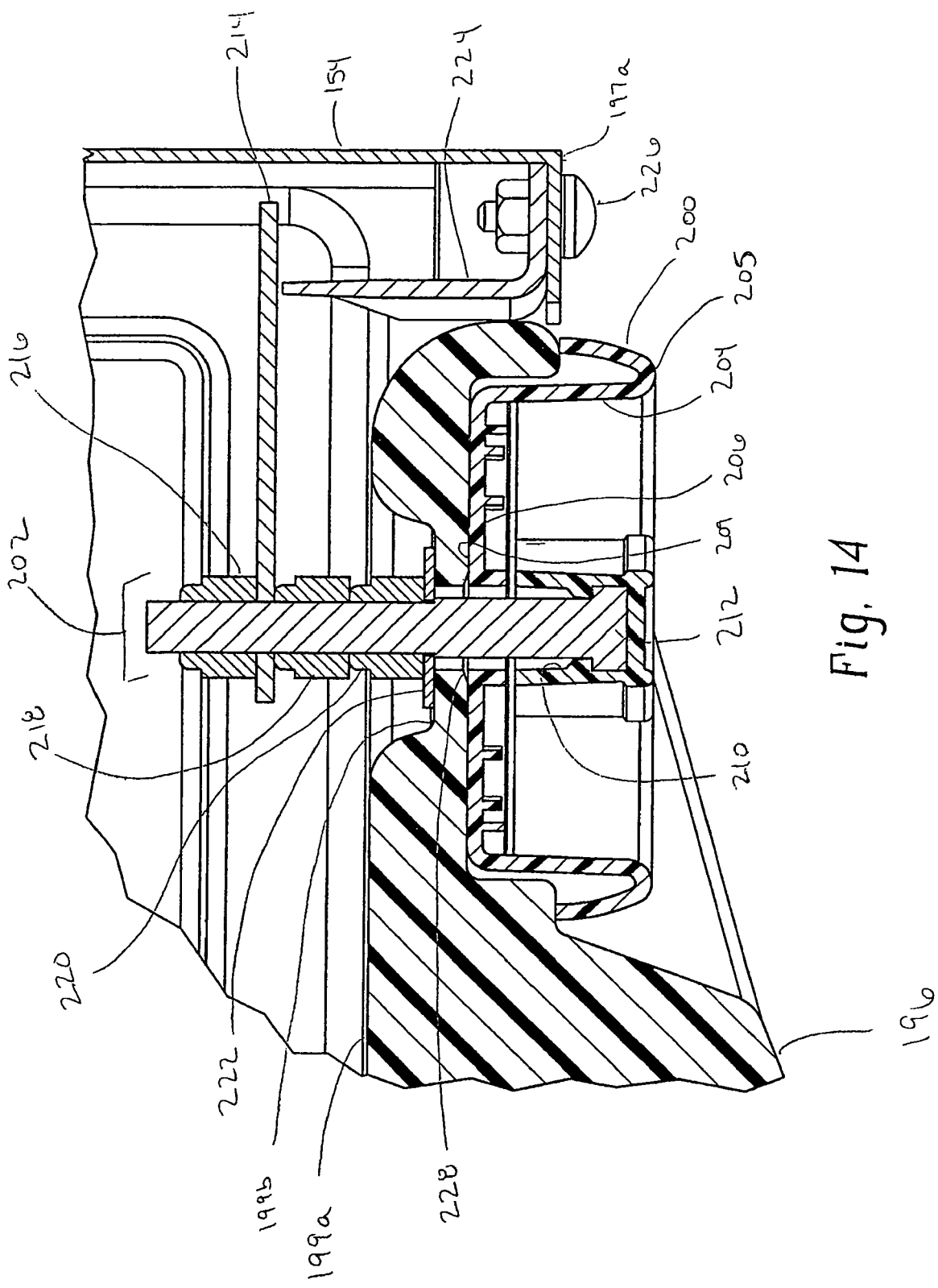
FIG. 14 is a cross-sectional view of a latch assembly taken along line 14-14 of FIG. 11.

With reference to FIG. 14, door 196 preferably includes latch assembly 198 to retain the door in a closed position when desired. The latch assembly includes a handle or grip 208 that is inserted or snapped into outer member 200. Outer member 200 preferably includes an upper rounded surface 205. The latch assembly includes a latching mechanism 202, which includes latch shaft 212 and latch arm 214. The latch shaft is inserted through a domed push-on ring 228 which is located just between the outer surface of door 196 and the inner surface 209 of outer member 200. The latching mechanism is held in position relative to the door by retaining ring 222 which is held in place by threaded nuts 218 and 220. Latch arm 214 is held in position by threaded nut 216.

FIG. 14 shows the latch assembly in a locked position such that door 196 will not open. A catch 224 is releasably connected to front flange 197a by fastener 226. To lock the door, or prevent it from opening, the door is closed in the position that is shown in FIG. 12 and the latch assembly is rotated such that the latch arm is moved into a horizontal position behind catch 224.

As previously described with respect to FIG. 1, the storage units are connected to a vehicle floor and wall. At least one connecting member, such as, for example, wall attachment bracket 26, is fastened to a portion of the vehicle wall and to the storage unit. The wall attachment bracket may be connected to the storage unit by any suitable means. Preferably, the attachment bracket is connected to the storage unit by a fastener inserted through an aperture of the attachment bracket and an aperture in one or more end panels of the storage unit. For example, the attachment bracket may be connected through any of apertures 43, 54 or 56 of the storage unit in FIGS. 2-6; apertures 107, 101 or 103 of the storage unit in FIGS. 7-8; apertures 165, 162 or 164 of the storage unit in FIGS. 9-10; and/or any other apertures that may be located in the end panels. Storage units may also be connected to the vehicle by fastening a wall attachment bracket to one or more of the rear connecting members of the storage unit(s).

Figure 15:
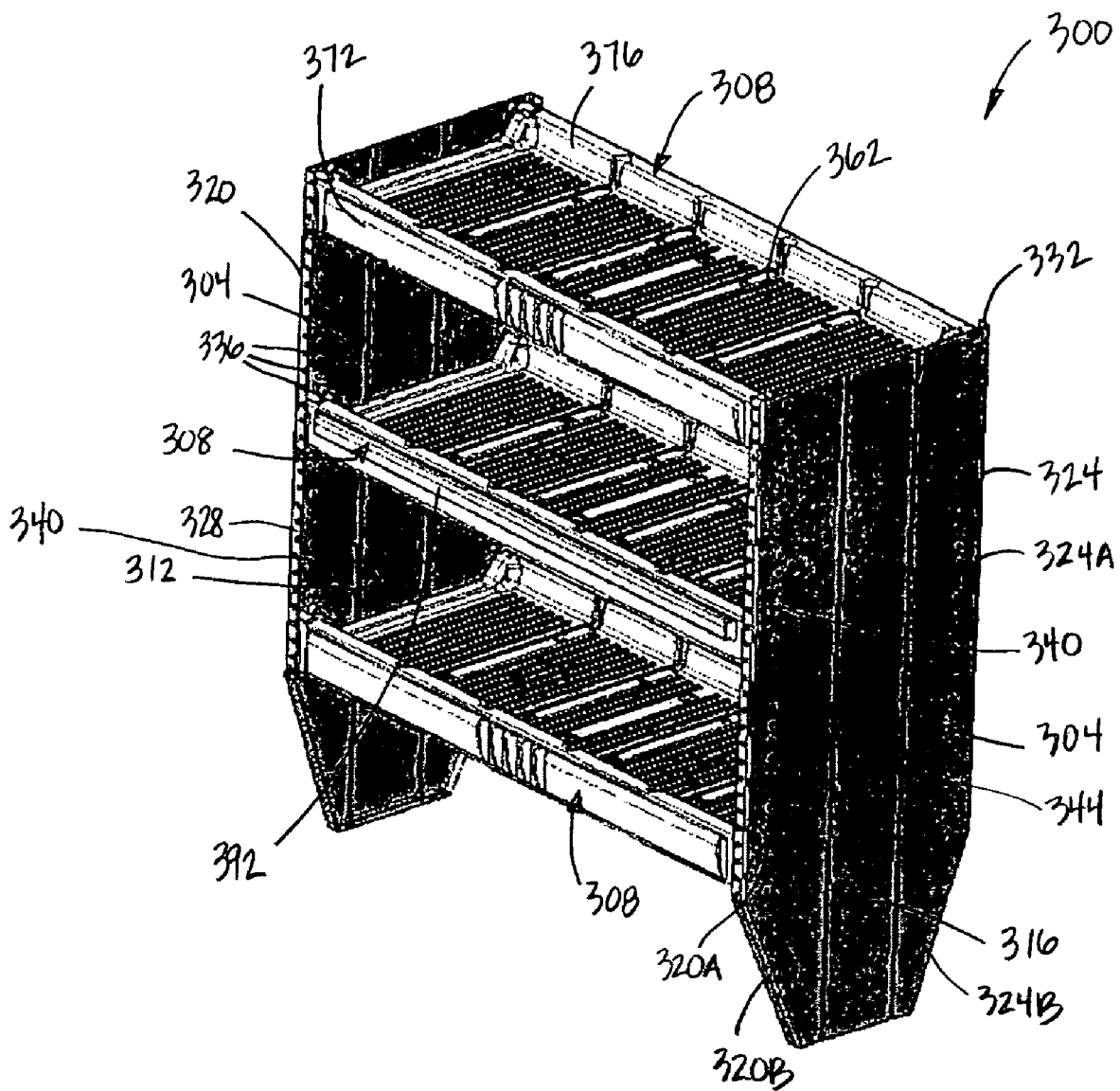
FIG. 15 is a perspective view of another embodiment of a storage unit according to the invention.
Figure 16A:
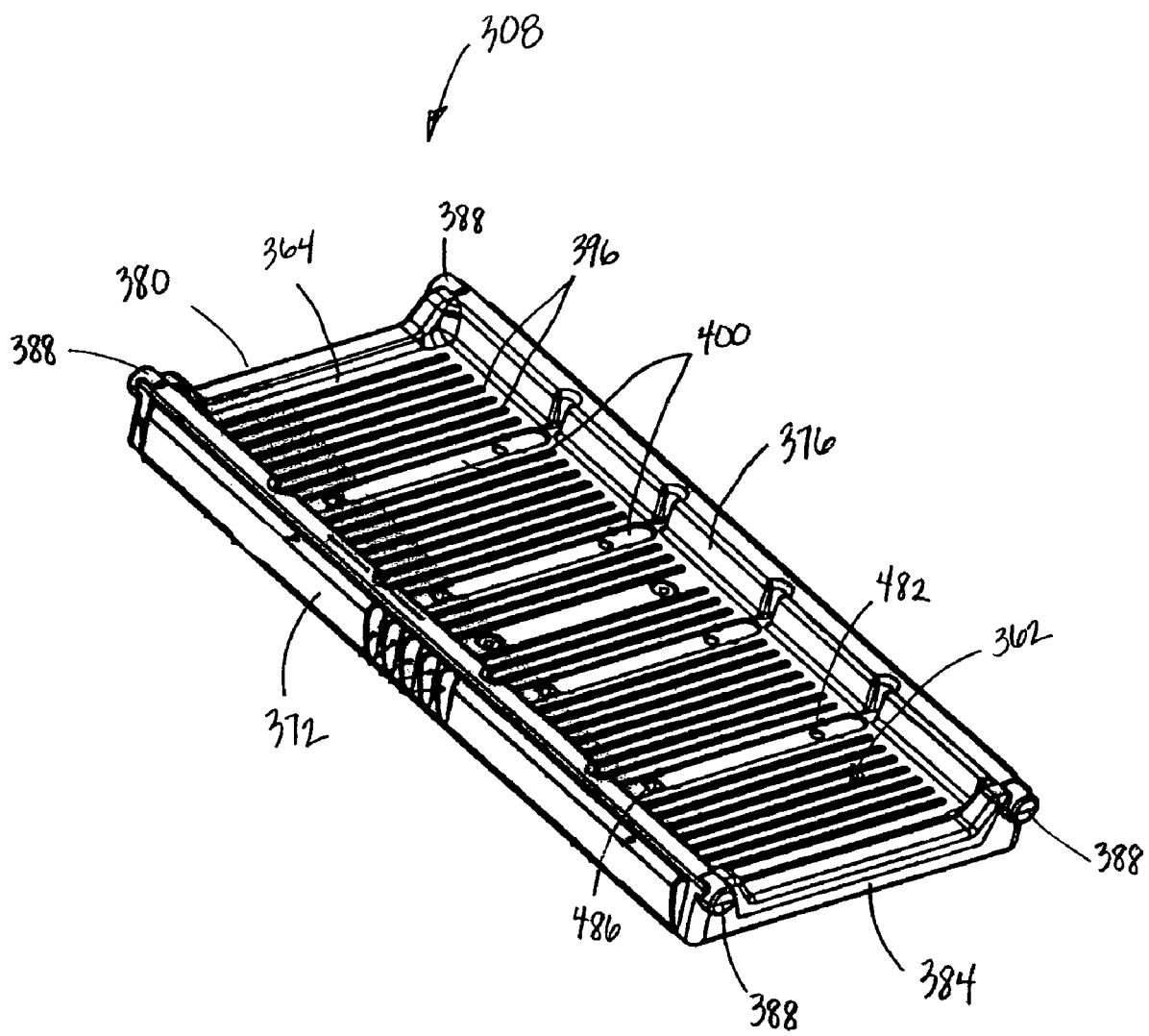
FIG. 16A is a front perspective view of a shelf of the storage unit shown in FIG. 15.
Figure 16B:
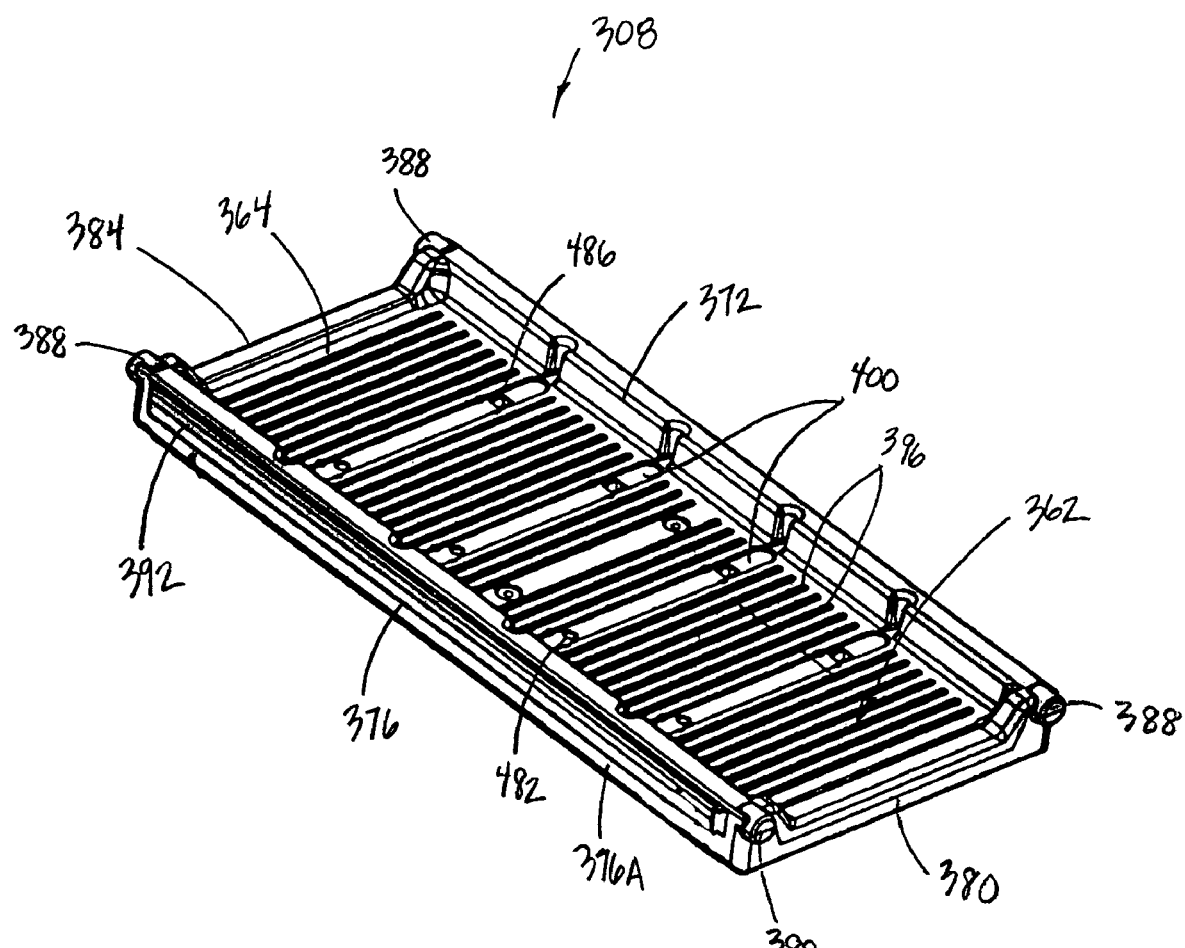
FIG. 16B is a rear perspective view of the shelf of the storage unit shown in FIG. 15.

Referring to FIG. 15, a storage unit 300 according to another embodiment of the invention is shown. The storage unit 300 includes a pair of opposing end panels 304 with a plurality of shelves 308 removably disposed between the end panels 304. In one embodiment, the end panels 304 are connected by one or more connecting members (e.g., back panels, front connecting member, or the like), as discussed above.

In the illustrated embodiment, the end panels 304 are mirror images of one another; thus, unless otherwise stated, references made to one end panel are also intended to describe the other, opposing, panel. The end panels 304 may be altered to accommodate mounting in a particular vehicle or for particular storage needs. Each end panel includes an inner surface 312, an outer surface 316, a front edge 320, and a rear edge 324. The front edge 320 includes a substantially vertical portion 320A and a lower angled portion 320B toward a bottom of the panel 304. The rear edge 324 also includes a substantially vertical portion 324A and a lower angled portion 324B toward a bottom of the panel, such that the front and rear edges 320, 324 are mirror images of each other. In a further embodiment, either or both edges may be substantially vertical over a height of the panel or include an angled upper edge. The lower angled portion 320B of at least the front edge 320 creates more storage space on a floor of the cargo space of the vehicle.

In the illustrated embodiment, the front edge 320 defines a front flange 328 integral with and substantially perpendicular to the inner and outer surfaces 312, 316 of the end panels 304, and the rear edge 324 defines a rear flange 332 integral with and substantially perpendicular to the inner and outer surfaces 312, 316 of the end panels 304. Both the front and rear flanges 328, 332 are oriented toward an interior area of the storage unit 300. The front and rear flanges 328, 332 each include a vertical portion and an angled portion corresponding to portions of the respective edge 320, 324. At least the vertical portions of each flange 328, 332 include a plurality of apertures 336. In one embodiment, the apertures 336 are used for coupling a connecting member to the end panels 304.

The storage unit 300 contains a plurality of shelves 308 (FIGS. 16A, 16B, and 17-19) disposed between the end panels 304. Each end panel 304 includes a first vertical row of apertures 340 adjacent the vertical portion 320A of the front edge 320, and a second vertical row of apertures 344 adjacent the vertical portion 324A of the rear edge 324. In the illustrated embodiment, the vertical rows of apertures 340, 344 are parallel to one another and positioned opposite one another such that opposing apertures 340, 344 within a given end panel lie in the same horizontal plane. Further, each aperture in one end panel has a corresponding aperture in the opposing end panel such that corresponding apertures in opposing end panels lie in the same horizontal plane.

Figure 20:
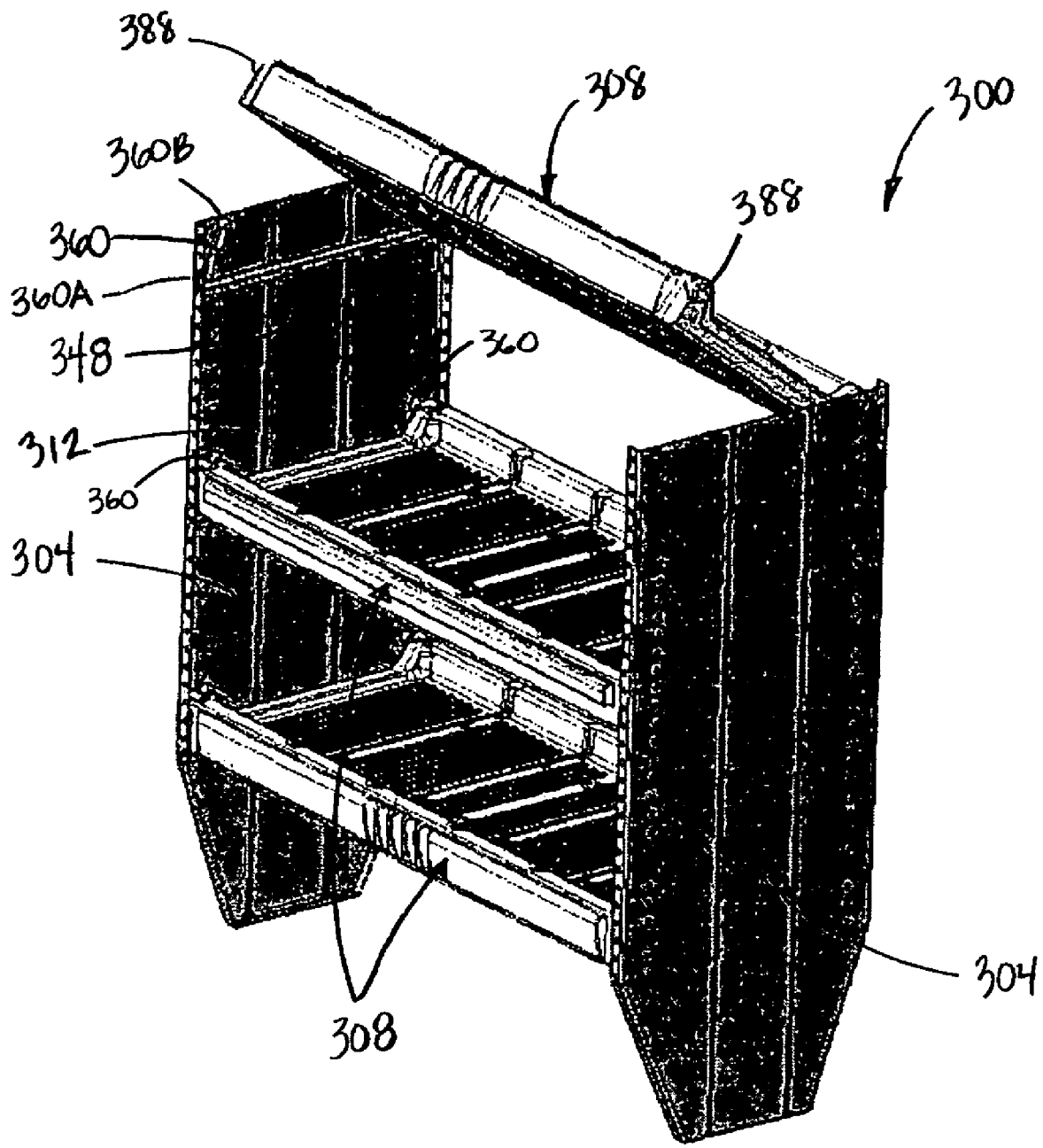
FIG. 20 is a perspective view of the storage unit shown in FIG. 15 with one of the shelves in an up position.
Figure 20A:
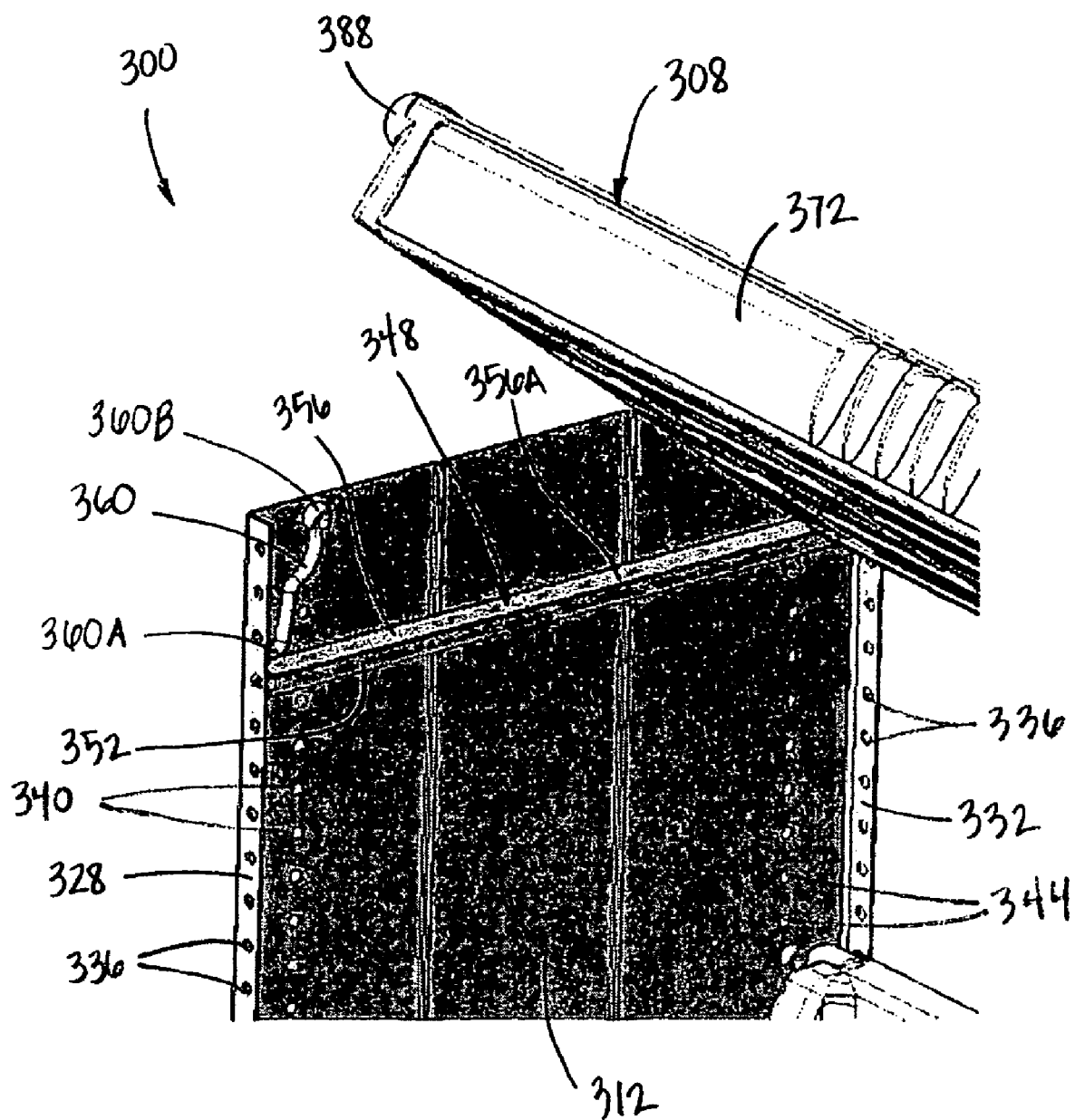
FIG. 20A is an enlarged area of a portion of the storage unit shown in FIG. 20.

The shelves 308 are supported within the storage unit by shelf supports 348, as shown in FIGS. 20 and 20A. Each shelf support 348 is generally L-shaped and extends between the front and rear flanges 328, 332 of the respective end panel 304. A base portion 352 of the support 348 is aligned generally parallel with the inner surface 312 of the end panel 304, and a flange portion 356 extends outwardly from the base portion 352, generally perpendicular to and integral with the base portion 352. The flange portion 356 defines a substantially horizontal upper surface 356A for supporting the respective shelf 308. As discussed below, the shelf supports 348 include retaining clips 360 for releasably coupling the shelves 308 to the shelf supports 348.

The shelf supports 348 are releasably coupled to the end panels 304 similarly to the shelf supports 58 discussed above with respect to FIG. 3. Each shelf support 348 is coupled to the inner surface 312 of the end panel 304 by fasteners, which are inserted through opposing apertures 340, 344 in the first and second vertical rows and corresponding apertures (not shown) in the base portion 352 of the shelf support 348. Any fastener suitable for holding shelf supports 348 in position may be used, provided the fastener is removable from the apertures 340, 344.

Referring to FIGS. 16A, 16B and 17-19, each shelf 308 includes a base portion 362, which defines a top, support surface 364 and a bottom surface 368, a forward wall 372, a rearward wall 376, and a pair of side edges 380, 384. The shelf 308 is positioned between the end panels 304 (i.e., within the storage unit 300) such that the bottom surface 368 rests on the upper surface 356A of the shelf supports 348. In the illustrated embodiment, the shelves 308 have a width slightly less than a distance between inner surfaces 312 of opposed end panels 304 such that the side edges 380, 384 of the shelves 308 contact the respective inner surfaces 312 to provide a snug fit in the storage unit 300.

The forward and rearward walls 372, 376 of each shelf 308 define generally cylindrical projections 388 that extend generally outward from the side edges 380, 384. In the illustrated embodiment, the projections 388 are positioned in each corner of the shelf 308. As discussed above, each shelf support 348 includes a retaining clip 360 positioned at each end of the shelf support 348, that is one clip positioned adjacent the front flange 328 and one clip positioned adjacent the rear flange 332. Due to the symmetry of the vertical rows of apertures 340, 344 on each panel 308, the retaining clips 360 adjacent the front flange 328 on opposed end panels 304 are generally parallel and the retaining clips 360 adjacent the rear flange 332 on opposed end panels 304 are generally parallel. To secure the shelf 308 within the storage unit 300 and to the end panels 304, each projection 388 is snap-fit between a retaining clip 360 and the corresponding front or rear flange 328, 332. Thus, the shelf 308 is secured to the shelf supports 348 at each corner of the shelf 308. In the illustrated embodiment, the projections 388 are molded into the shelf. It should be readily apparent to those of skill in the art that in a further embodiment the projections 388 are separate components coupled to the shelf 308.

Referring to FIG. 20A, each retaining clip 360 is generally S-shaped, and includes a first end 360A for coupling to the shelf support 348 and a free end 360B extending generally upward from the shelf support 348. In the illustrated embodiment, the retaining clips 360 are coupled to the upper surface 356A of the shelf supports 348. When the shelf support 348 is secured to the end panel 304, the free end 360B of the retaining clip 360 is spaced apart from the respective flange 328, 332 a distance sufficient to receive and retain a projection 388 of the shelf 308.

Referring to FIGS. 15, 20 and 20A, the shelf 308 is moveable between a retained, down position (FIG. 15) and an up position (FIG. 20) to gain access to a lower shelf. In order to move the shelf 308 to an up position, the front projections 388 of the shelf 308 are removed or lifted out of engagement with the retaining clips 360. The forward wall 372 of the shelf 308 is rotated upward about a pivot point defined by the rear projections 388 of the shelf 308. To remove the shelf 308 from the storage unit 300, all of the shelf projections 388 are removed or lifted out of engagement with the respective retaining clips 360. Since no fasteners are used to couple the shelves 308 to the shelf supports 348 or the end panels 304, the shelves 308 are easily removable from the storage unit 300.

Each shelf 308 may be installed in the storage unit 300 in either a first direction, in which the forward wall 372 is positioned adjacent the front edges 320 of the end panels 304, or a second direction, in which the rearward wall 376 is positioned adjacent the rear edges 324 of the end panels 304. The location of the shelf projections 388 and the retaining clips 360 facilitate dual orientation of the shelf 308 within the storage unit 300. An exterior surface 376A of the rearward wall 376 includes a projection 392 (FIGS. 16B and 17-19) extending outwardly from the exterior surface 376A and along a length of the rearward wall 376. The projection 392 includes a first width adjacent the exterior surface 376A and a second width at a free end 392A of the projection 392, whereby the second width is greater than the first width. The projection 392 provides an area for attaching a label to the rearward wall 376 of the shelf 308 when the shelf 308 is in a forward direction.

The shelf 308 includes the side edges 380, 384, the rearward wall 376, the forward wall 372, and the base portion 362 defining a horizontal area with the top surface 364 and the bottom surface 368. In the illustrated embodiment, the bottom surface 368 of the base portion 362 is offset upwardly relative to a bottom edge of the forward and rearward walls 372, 376, and the top surface 364 is offset downwardly from an upper edge of the walls 372, 376. A height of the shelf walls 372, 376 and/or a depth of the shelf 308 from the upper edge of the walls 372, 376 to the top surface 364 of the base portion 362 may be selected as desired for a particular vehicle or intended use and provides extra storage area. The upwardly offset bottom surface 368 of the base portion 362 provides additional space between successive shelves 308. In the illustrated embodiment, the shelf 308 is generally rectangular; however, the shelf 308 may be configured in any shape as desired for a particular vehicle or intended use. For example, the forward wall 372 of the shelf may be bowed outwardly or inwardly.

As shown in FIGS. 16A, 16B and 17-19, the shelf 308 is an integral component formed from a single plastic body. The inner surfaces of the walls 372, 376 and the top surface 364 of the base portion 362 form a shelf tray for supporting items. Additionally, the top surface 364 and/or the bottom surface 368 of the base portion 362 may be configured as desired for a particular vehicle or intended use. In the illustrated embodiment, the top surface 364 includes protrusions 396 and grooves 400 for structural support and to increase friction of the tray. The protrusions 396 form elongated ribs extending between the forward and rearward walls 372, 376. The protrusions 396 and/or grooves 400 may be configured in any size and shape as desired and are not limited to any particular size and/or number. It should be readily apparent to those of skill in the art that the top and bottom surfaces 364, 368 of the shelf 308 may include other shapes or configurations for providing structural support or to increase friction on the tray.

Figure 17:
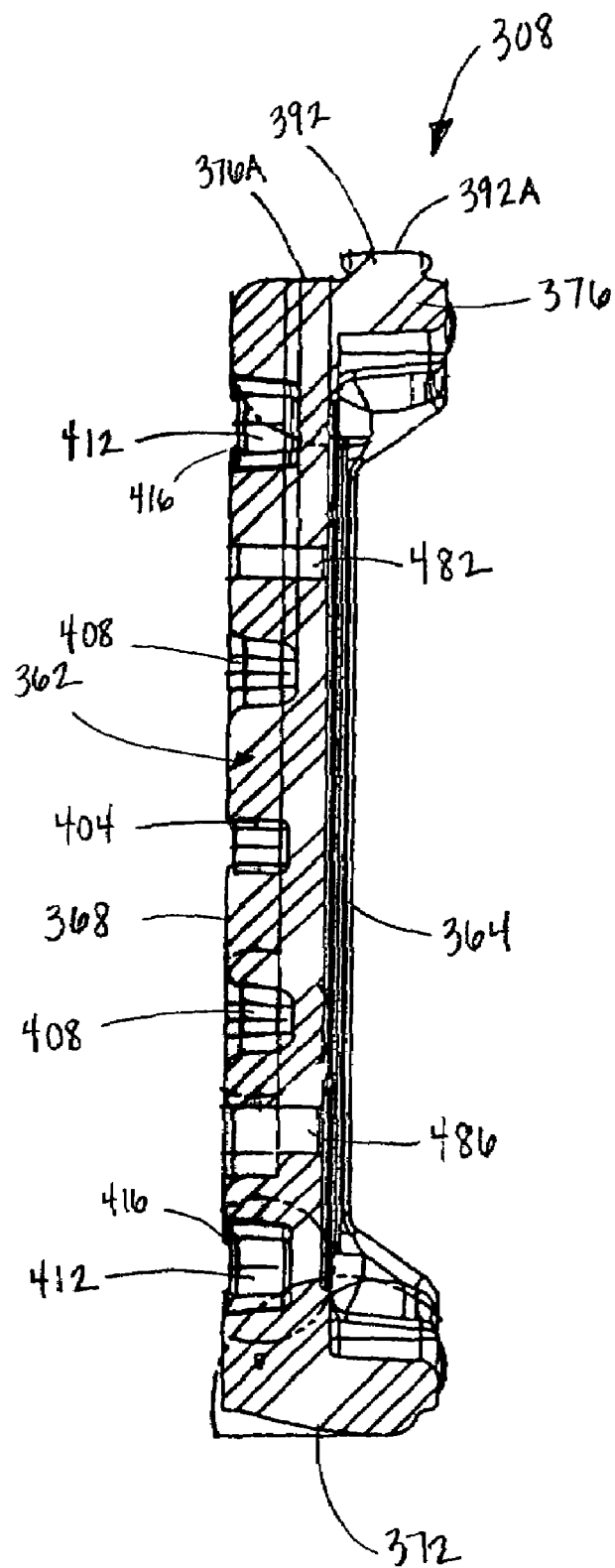
FIG. 17 is a cross-sectional view of the shelf taken along line 17-17 of FIG. 16B.
Figure 19:
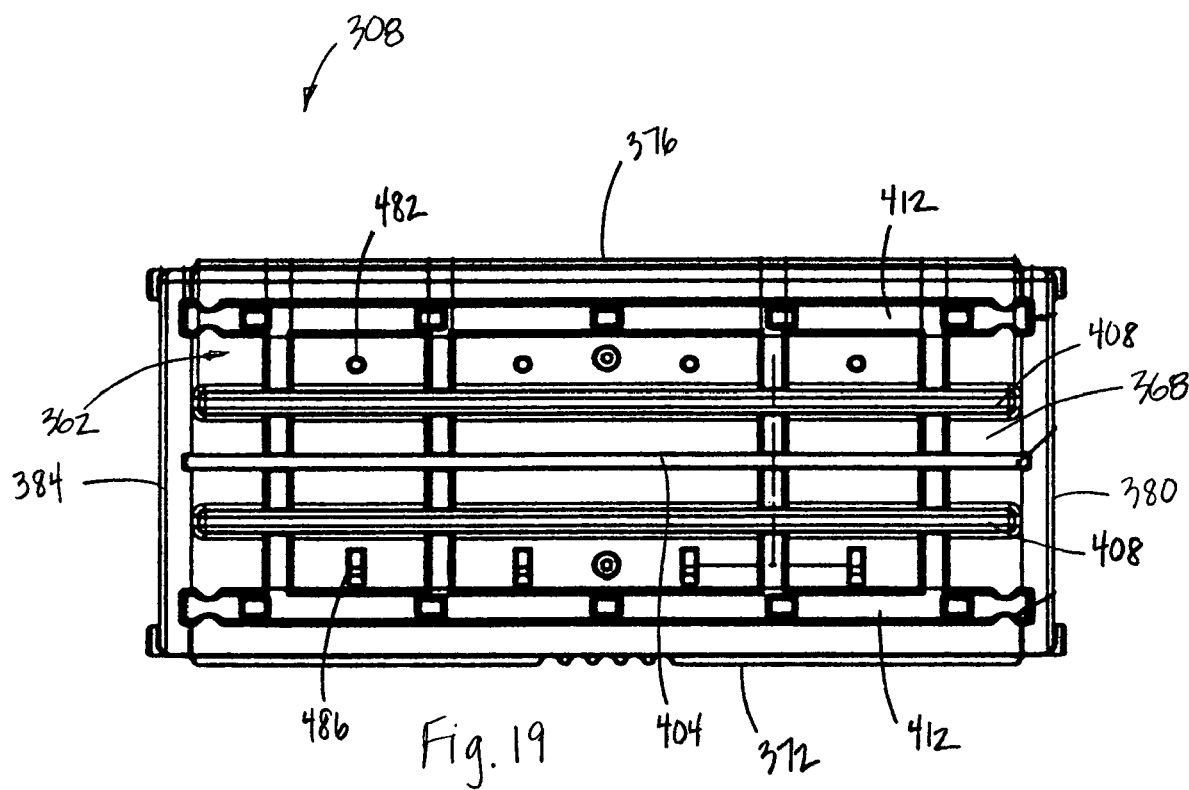
FIG. 19 is a bottom view of the shelf of the storage unit shown in FIG. 15.

Referring to FIGS. 17-19, the shelf 308 includes structural members to provide additional support to the shelf 308 within the storage unit 300. The shelf 300 includes a support bar 404 molded or encapsulated within the shelf 308 for providing additional structural support and providing a load rating for the shelf 308. The support bar 404 is generally U-shaped and extends between the side edges 380, 384 of the shelf 308. In the illustrated embodiment, the support bar 404 is positioned within a slot recessed from the bottom surface 368 of the shelf 308. The bottom surface 368 of the shelf 308 also includes two structural grooves 408 and two slots 412 that extend between the side edges 380 of the shelf 308 for providing additional structural support to the shelf 308. Each slot 412 includes inwardly extending flanges 416 for supporting a support bar (not shown). The slots 412 are shaped and configured to mate with and surround a support bar, which preferably snap-fits into the slots 412 to fit snugly therein. It should be readily apparent to those of skill in the art that the shelf 308 may include fewer or more structural grooves 408 and support bar slots 412, as well as fewer or more molded support bars 404.

In one embodiment, the support bars are sized and configured such that exposed edges of the support bars are substantially co-planar with the bottom surface 368 of the shelf 308 and will contact the upper surface 356A of the respective shelf supports 348. In another embodiment, the exposed edges of the support bars are recessed from the bottom surface 368 of the shelf 308. It should be readily apparent to those of skill in the art, that support bars or beams having different cross-sectional shapes, such as a hollow square or rectangle, may be used.

The support bars provide further support across the shelf 308 such that the shelf 308 is able to support a greater load and the support bars provide a method for adjusting a load rating of a shelf. For example, a shelf that includes the molded support bar 404 and empty slots 412 has a first load rating. A shelf including a support bar inserted into one of the slots 412 has a second higher load rating, a shelf including support bars inserted into both slots has a third higher load rating, and so forth. The shelf's load rating may be adjusted by either adding or removing bars as needed for the intended use. The support bars may be made from steel, extruded aluminum, fiber reinforced composite, or other load bearing material.

Figure 21:
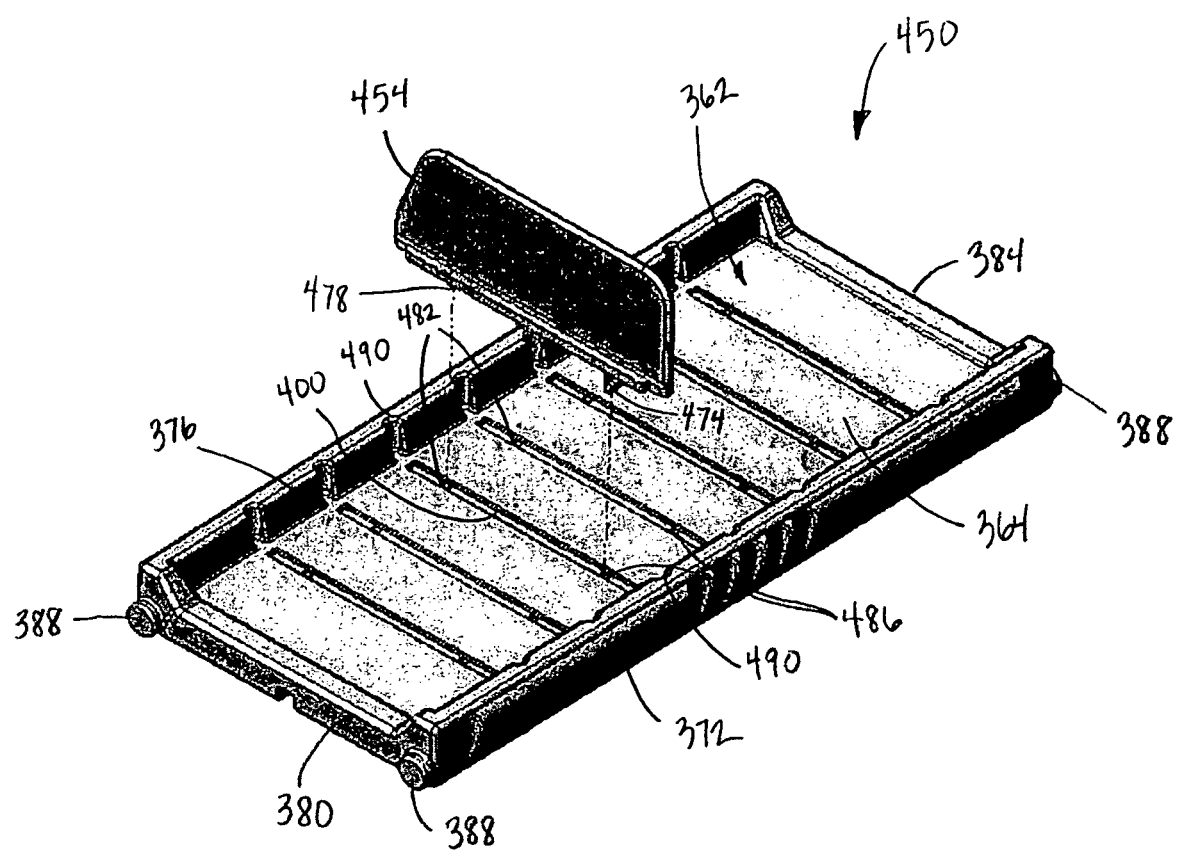
FIG. 21 is a perspective view of the shelf shown in FIG. 16A including a divider.

FIG. 21 illustrates a shelf 450 including a removable divider 454 (FIG. 22) according to another embodiment of the invention. The shelf 450 is similar to the shelf 308 discussed above with respect to FIG. 15, whereby like elements will be identified by the same reference numerals. The divider 454 is coupled to the shelf 450 to divide storage areas of the shelf 450 into discrete, smaller areas. In the illustrated embodiment, the shelf 450 includes a single divider 454, although it should be readily apparent to those of skill in the art that more dividers may be coupled to the shelf 450.

The divider 454 includes a bottom edge 458, a top edge 462, a first side edge 466, and a second side edge 470. In the illustrated embodiment the first side edge 466 is generally vertical, whereas the second side edge 470 extends inwardly and upwardly from the bottom edge 458 to the top edge 462. A hook 474 positioned proximate the first side edge 466 and a projection 478 positioned proximate the second side edge 470 extend downwardly from the bottom edge 458 of the divider 454. To couple the divider 454 to the shelf 450, the projection 478 is received in a first aperture 482 formed in the base portion 362 of the shelf 450. The hook 474 snap-fits within a second aperture 486 formed in the base portion 362 of the shelf 450 to secure the divider 454 to the shelf 450. In the illustrated embodiment, at least the second aperture 486 passes through the base portion 362 of the shelf 450, thereby allowing the hook 474 to lock to the bottom surface 368 of the shelf 450. The apertures are also shown in FIGS. 17 and 18.

Referring to FIGS. 17-19 and 21, the bottom edge 458 of the divider 454 is received by one of the grooves 400 or slots, formed in the top surface 364 of the shelf 450. The inner surfaces of the forward wall 372 and the rearward wall 376 also define grooves 490, or slots, for receiving the side edges 466, 470 of the divider 454. The divider grooves formed in the inner surfaces of the walls 372, 376 are aligned with one of the divider grooves 400 formed in the top surface 364 of the shelf 450. The grooves 400, 490 further support and secure the divider 454 to the shelf 450. The dividers 454 are easily clipped or snapped into position on the shelf 450, and thereby are easily removable or moveable to another location depending on a particular vehicle or intended use. It should be readily apparent to those of skill in the art that the divider 454 may be coupled to the shelf 450 at any one of the grooves 400 defined in the shelf 450. In a further embodiment, the divider is coupled to the shelf by fasteners received by apertures in the shelf. Examples of suitable fasteners include screws, bolts, rivets, pins and the like.

Figure 22:
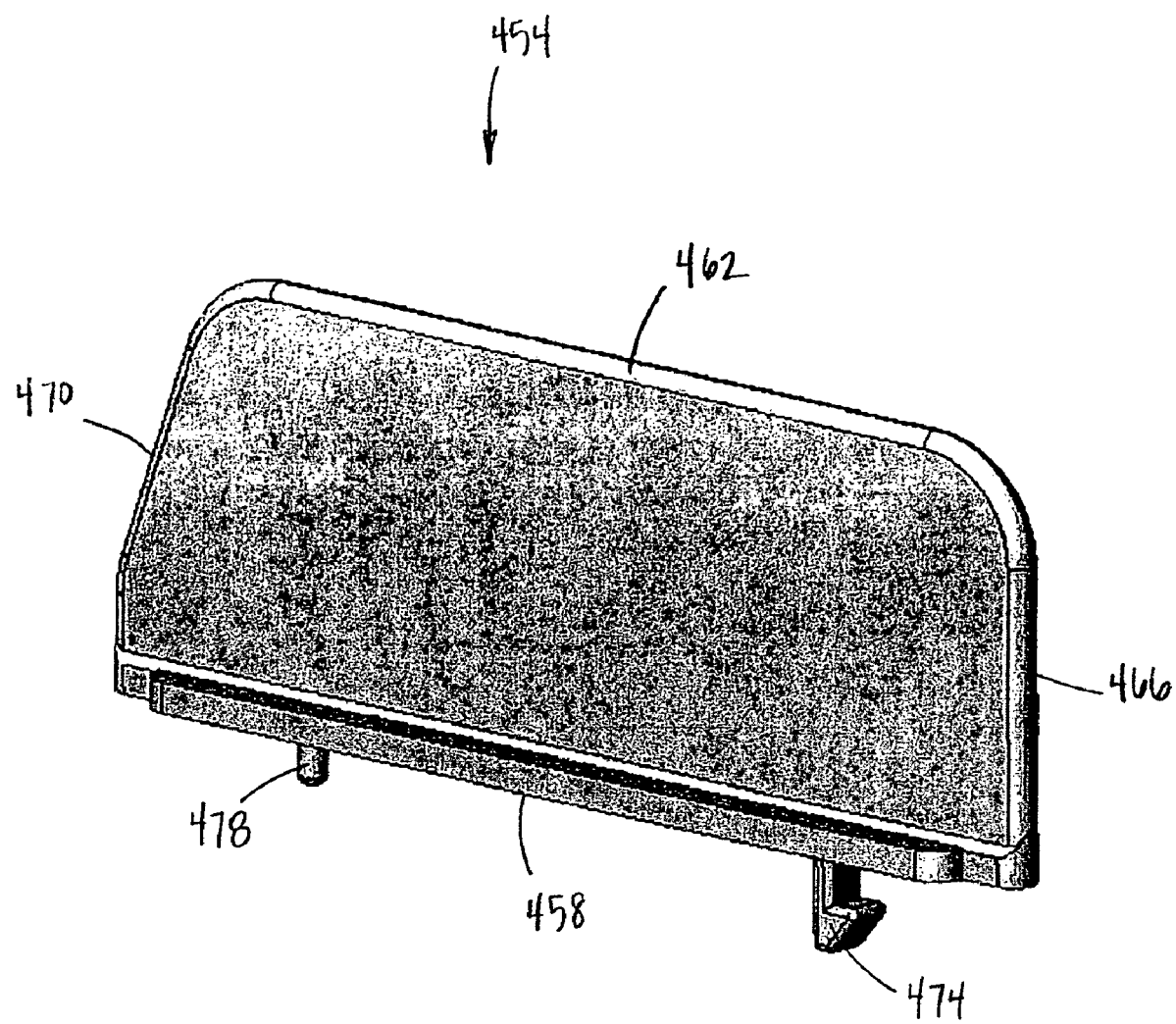
FIG. 22 is a perspective view of the divider shown in FIG. 21.
Figure 23:
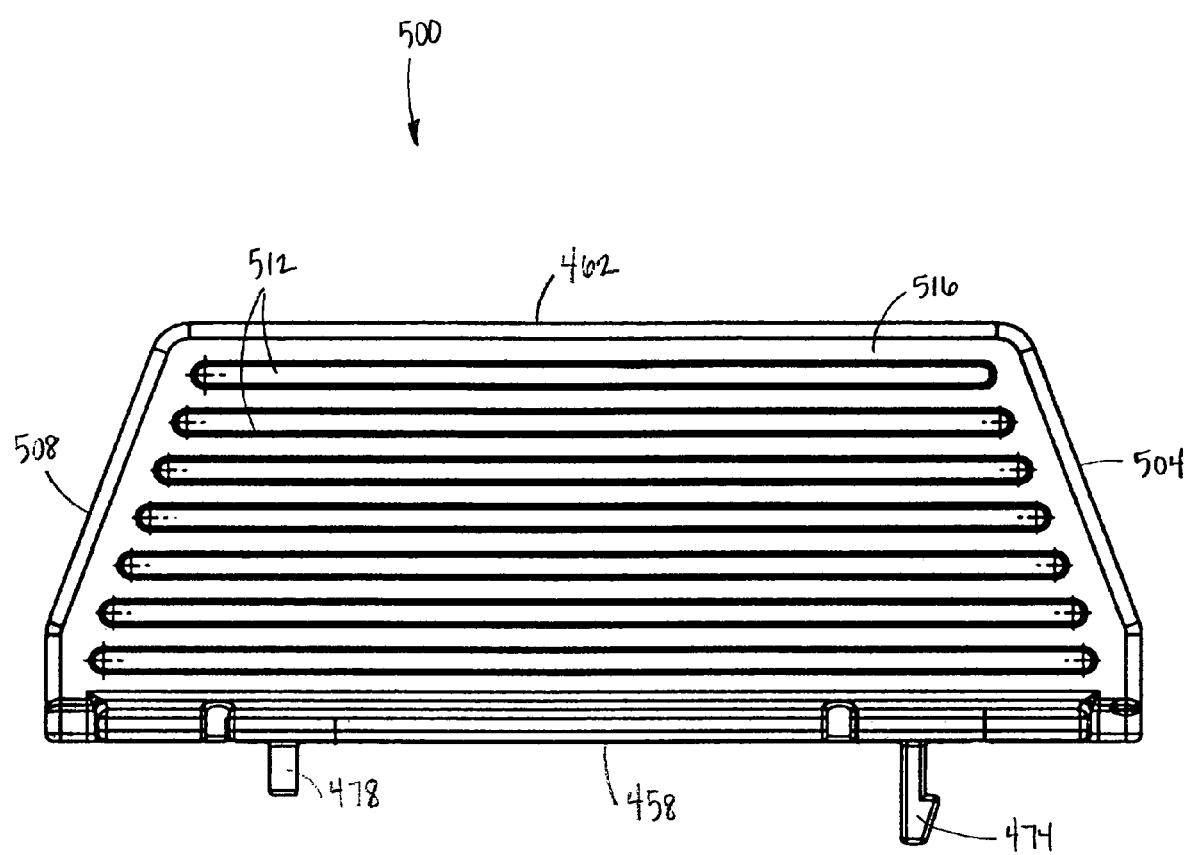
FIG. 23 is a side view of another embodiment of a divider for use with the shelf shown in FIG. 6A.

FIG. 23 illustrates another embodiment of a divider 500 similar to the divider 454 shown in FIG. 22, whereby like elements will be identified by the same reference numerals. The divider 500 includes side edges 504, 508 that extend inwardly and upwardly from the bottom edge 458 to the top edge 462. The divider 500 also includes grooves 512 formed in side surfaces 516 of the divider 500 to provide structural support and/or a friction surface for the divider 500. The grooves 512 extend between the first and second side edges 504, 508 of the divider 500.

Figure 24:
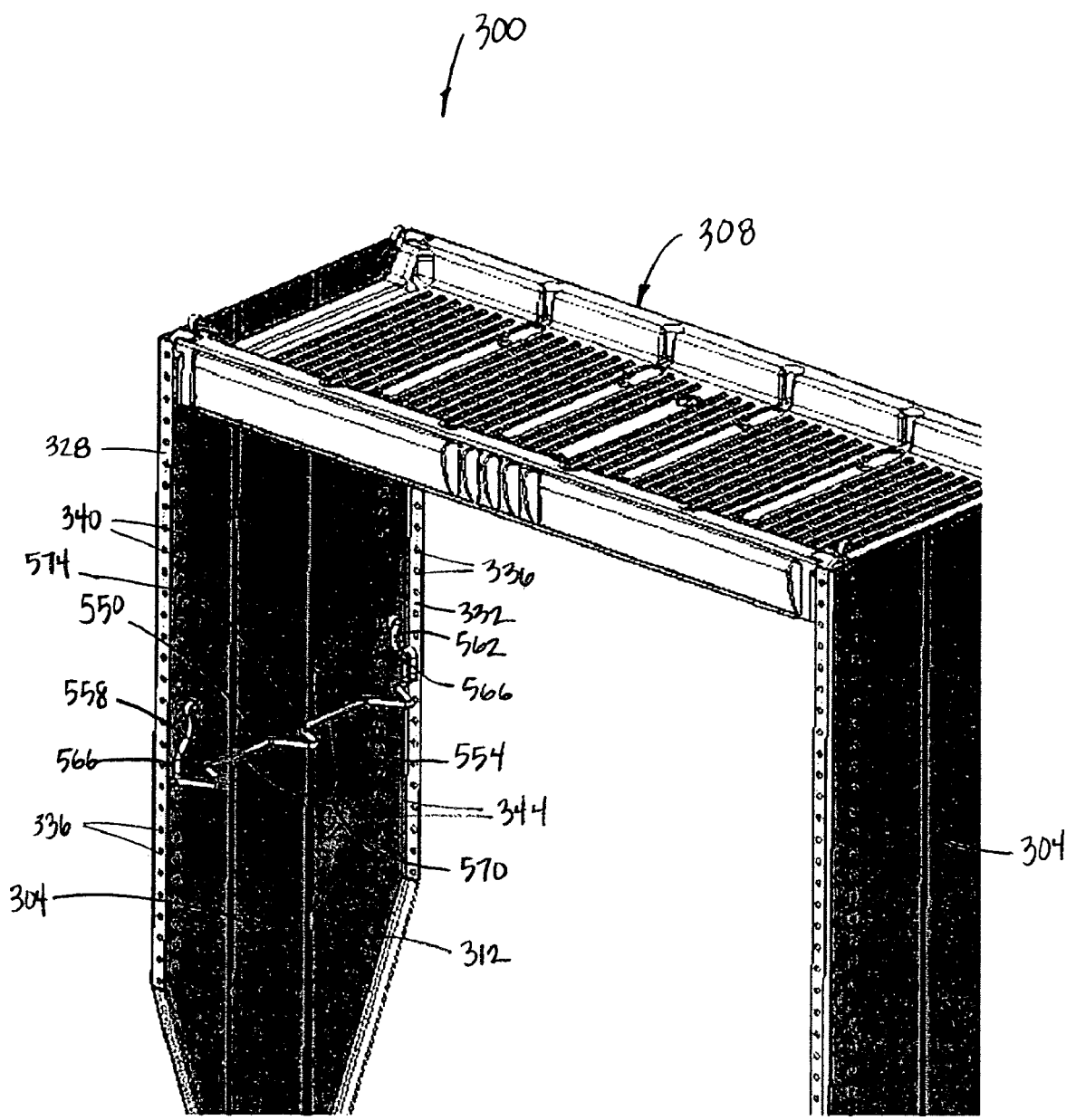
FIG. 24 is a perspective view of the storage unit including a support shelf according to another embodiment of the invention.
Figure 25:
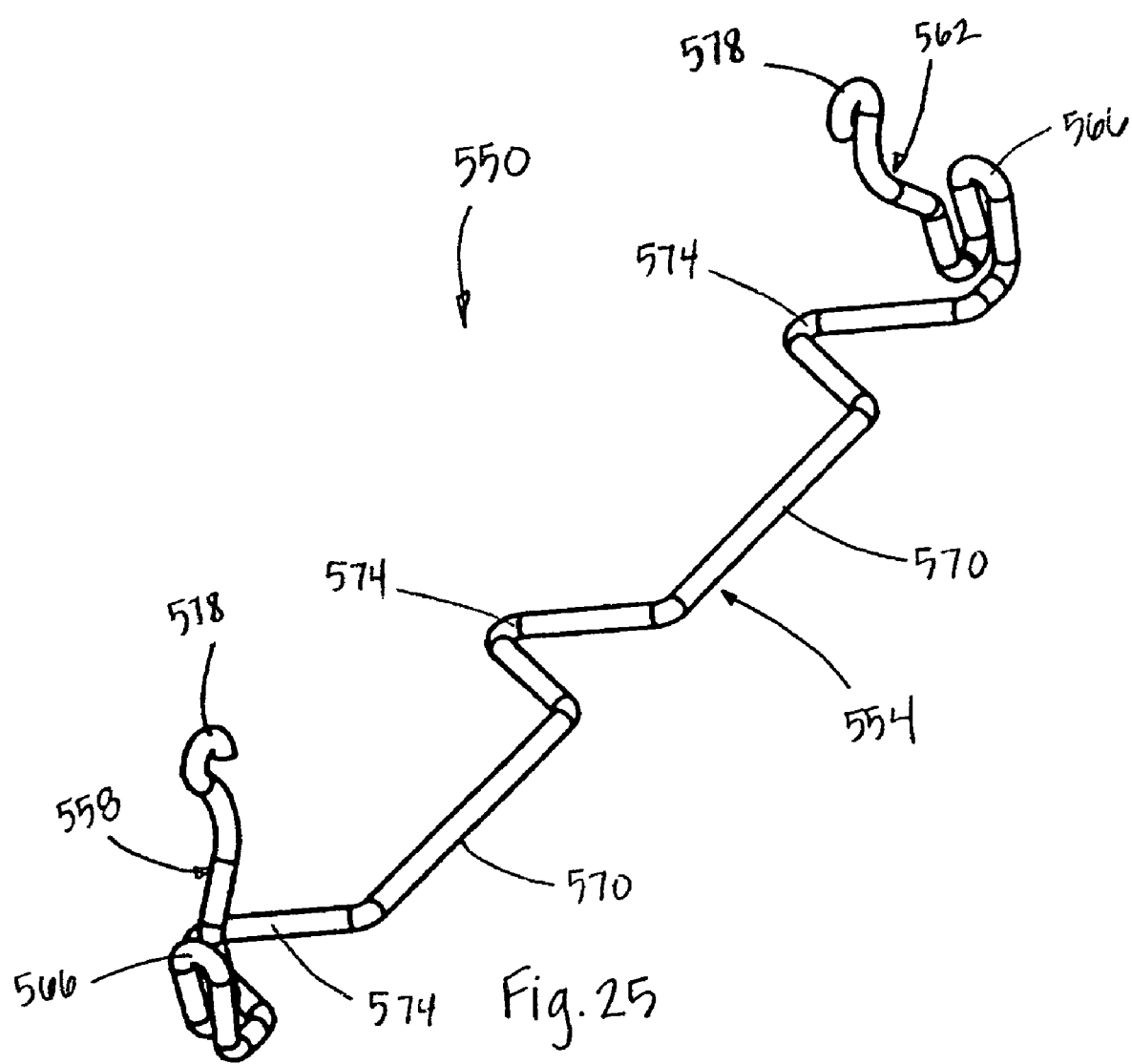
FIG. 25 is a perspective view of the retaining clip shown in FIG. 24.

FIGS. 24 and 25 illustrate a shelf support 550 according to another embodiment of the invention and for use with the storage unit 300. In the illustrated embodiment, the shelf support 550 is formed from a wire or coated wire, although in further embodiments the shelf support 550 may be formed from other materials. The shelf support 550 includes a central portion 554, a first free end 558 defining a retaining clip, a second free end 562 defining a retaining clip, and a loop portion 566 positioned between the central portion 554 and each free end 558, 562. The shelves 308 are supported within the storage unit 300 by the central portion 554 of the shelf supports 550 and retained in position by the retaining clips 558, 562.

The shelf supports 550 are releasably coupled to the end panels 304 similarly to the shelf supports 348 discussed above with respect to FIG. 19. Each shelf support 550 is coupled to the inner surface 312 of the end panel 304 by pins (not shown), or fasteners, which are inserted through opposing apertures 336 in the front and rear flanges 328, 332. The loop portions 566 of each shelf support 550 receive one of the opposed pins to couple the shelf support 550 to the end panels 304. To mount the shelf support 550, one of the loop portions 566 is placed around the respective pin and the opposite loop portion 566 is placed around the opposite pin such that a generally straight edge 570 of the central portion 554 is flush with the inner surface 312 of the end panel 304. Any pin or fastener suitable for holding shelf supports 550 in position may be used, provided the fastener is removable from the apertures 336.

The central portion 554 of the shelf support 550 supports the shelf 308 within the storage unit 300. In the illustrated embodiment, the central portion 554 includes three generally V-shaped sections 574 interconnected by two straight sections 570. When the shelf support 550 is mounted to the end panel 304, the straight sections 570 are flush with an inner surface 312 of the end panel 304 and the shelf 308 rests upon the V-shaped sections 574. It should be readily apparent to those of skill in the art that in further embodiments the central portion 554 may have other configurations for supporting the shelf.

Each free end 558, 562 of the shelf support 550 defines a retaining clip for coupling the shelf 308 within the storage unit 300. The retaining clip portion 558, 562 is similar to the retaining clip 360 discussed above with respect to FIG. 19, whereby like elements will be referenced by the same reference numerals. Each retaining clip portion 558, 562 is generally S-shaped and includes a free end 578 extending generally upward from the loop portion 566 of the shelf support 550. When the shelf support 550 is secured to the end panel 304, the retaining clip portion 558, 562 is spaced apart from the respective flange 328, 332 a distance sufficient to receive and retain the respective shelf projection 388.

Storage units of the present invention provide a modular system that is capable of being quickly reconfigured as desired by the user. To reconfigure a unit, a shelf or shelves are removed from the unit as desired or reoriented within the unit. This is done by either simply lifting the shelf out of its supports or by removing fasteners holding the shelf on the supports. Either operation can be performed from the front of the unit. The shelf supports that supported the removed shelf or shelves are removed by disconnecting the fasteners from the end panels and the shelf supports. This can be done from the front or sides of the unit. If desired, a shelf or shelves may be repositioned by changing the vertical position of the shelf supports along the vertical rows of apertures or rotating the shelf such that an opposite wall is facing forward. After a new location for a shelf is chosen, a pair of shelf supports are again releasably connected, opposite one another, to opposing end panels to define a substantially horizontal surface. A shelf is then positioned between the end panels by positioning the bottom surface of the shelf on the top surface of the shelf supports. The reconfigurable aspect of storage units according to the invention also allows the end user to create new storage compartments of different sizes if needed. For example, while in the field, a user may wish to add drawers to accommodate certain tools or parts. Provided the user has the necessary components, i.e., drawers, drawer slides and appropriate hardware, drawers may quickly be added by releasably attaching drawer slides to the end panels at a desired location. If necessary, a center-post drawer slide may also be added to accommodate, for example, two columns of drawers and allow the user to employ different sized drawers. For example, storage unit 100 may be viewed as a potential reconfiguration of unit 14 and vice versa. Thus, the components, i.e., shelving, supports, etc., of the storage units are readily removed and interchangeable. Because the shelves are removable independent of the shelf supports, and the shelf supports are releasably connected only through the end panels (and not through the back panels or connecting members), the system can be easily reconfigured as desired via the end panels without having to disconnect the entire unit from the vehicle wall and floor and dismantle the entire unit. Thus, storage units of the present invention allow users to reconfigure storages on the fly, even while in the field, which may reduce down time associated with waiting for a different vehicle to accommodate or supply the necessary equipment.

The interior storage components of storage units according to the invention, i.e., shelves, drawers, and drawer slides, are made from polymer materials such as plastic materials. Suitable plastic polymers include, but are not limited to polyethylenes, polypropylenes, polystyrene, acrylonitrile-butadien-estyrene resins and the like. The polymer materials may also be composite materials, i.e., a polymer matrix reinforced with a fiber or other reinforcing material having a sufficient length to thickness ratio to provide a desirable reinforcing function in one or more directions. A suitable composite material is a co-extruded polypropylene. The polymer materials used to form the shelves, drawers, drawer slides, etc., and/or the end panels are not limited in any manner. A wide range of polymer materials are commercially available from various sources. The polymer materials may have various strengths and other properties as needed for a particular application or intended use. The storage unit formed from a polymer material components are made by molding the polymer material into the desired shape for the particular component, and may be made by suitable molding methods such as injection molding, blow molding or the like. The shape and/or configuration of the shelves or drawers for drawer slides is not limited in any manner and may be configured to suit a particular vehicle or end use.

The end panels may be made from either steel or polymer materials. End panels formed from polymer materials may be made by processing techniques known in the art. As such, end panels made from polymers or composites may be formed into one particular shape as desired for a particular vehicle or intended use, and/or for aesthetic purposes. For example, plastic end panels made from polymer materials may have a configuration substantially similar to the configurations of the end panels in the first, second, and/or third embodiments. End panels made from polymer materials may further include ribbing or other surface configurations to impart strength to the end panels and/or to achieve a desired aesthetic appearance. Additionally, end panels may be formed from stock sheets of plastic or composite and cut and/or welded to the configuration desired for a particular vehicle or intended use. Any polymer material suitable for the shelves, drawers, etc. may also be used to form the end panels.

In preferred embodiments, the entire storage unit, at least with respect to the frame or end panels, the drawers and/or shelves, is made from a polymer material. In a particularly preferred embodiment, storage units, end panels, shelves, drawers and drawer slides are made from composite materials. The components are formed and welded with a co-extruded polypropylene (CPP) material, and have adjustment apertures in all connection point locations. The unit is 3-5 lbs lighter compared to an all steel construction of a similar configuration.

The use of polymer materials to form the shelves, drawers, drawer slides, end panels, etc., offers several advantages over the all steel construction of known storage systems. Polymer constructions are lighter in weight, which may improve the fuel economy of the vehicle. Polymer materials also dampen the noise associated with such storage units and are more quiet under normal load than the all metal constructions. Polymer constructions, hybrid constructions of light weight polymer materials, and, in particular, composite constructions exhibit strengths equivalent to or greater than steel constructions with the added advantage that such polymer constructions of being more resilient than steel. The formable nature of polymer materials allows for more variation or flexibility in design of the components and still provides a strong rigid structure. For example, the use of plastic or composite materials may allow for the reduction of two full end panels from a complete system employing several storage units of the invention, such as shown in FIG. 1, while maintaining the original design. Steel end panels are limited in the manner in which they may be formed. Namely, to work properly in the storage units of the invention, steel end panels must be formed with front and rear flanges facing inwardly to create a box. Thus, if a number of units are placed in a vehicle, such as shown in FIG. 1, three separate units would be required. Thus, on the street side wall 24 of vehicle 10, a total of six end panels are required. Polymer or composite materials, however, allow for more flexible design and configuration, which may allow for the use of a single panel that is capable of functioning as two panels. For example, an end panel formed from a composite or polymer material may have two flanges at each of the front and rear portions of the panel. A single panel may therefore serve as an end panel for two storage units. Thus, the number of end panels may be reduced in polymer or composite systems, as is the weight of the unit relative to steel units.

The use of polymer materials may result in lower production cost in that the plastic materials are generally less expensive than metal constructions. The plastic units are also more resilient than metal units and will not have to be replaced due to damage or wear as often as steel units, which may also provide an overall decrease in cost. Further, the polymer components allow for more flexibility in adjusting the shelves and also allows for more bulk head room and utilization of the space around the wheel well areas.

Additionally, the relatively low part count of the units also contributes to noise reduction. Specifically, there is a lower part count compared to conventional units because the supports and shelves are not connected through the back and/or front connecting members of the unit. There are therefore fewer contact points which may become loose and rattle.

The dimensions of the storage unit are not limited in any particular manner, except by the size and/or shape of the payload/cargo area of a vehicle. Thus, the present invention contemplates storage units of various heights and widths.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

Various features and advantages of the invention are set forth in the following claims.

What is claimed is:

1. A method for adjusting the load rating of a shelf formed from a polymer material, the method comprising:
   providing at least one shelf formed from a polymer, said shelf having a bottom surface, a front wall, a back wall, and a pair of opposing side walls, said at least one shelf further comprising a plurality of straight slots extending upwardly from the bottom surface of the shelf and running between the side walls of the shelf; and
   selectively inserting at least one support bar within at least one of said plurality of slots, said support bar being dimensioned to fit within at least one of said plurality of shelves such that a surface of the support bar is coplanar with the bottom surface of the shelf so that both the surface of the support bar and the bottom surface of the shelf are positioned to rest on opposing shelf supports, wherein the load rating of the shelf is adjusted by removing or inserting support bars from the plurality of slots.

2. An adjustable storage unit for a vehicle comprising:
   a frame system fastened to an interior of a vehicle, the frame system comprising:
      a pair of end panels opposite and parallel one another, and
      at least one connecting member connected to the end panels;
   at least one pair of opposing shelf supports releasably connected to the frame system; and
   at least one shelf formed from a polymer material disposed in the frame system, the at least one shelf supported within the frame system by contacting a bottom surface of the shelf with a top surface of the shelf supports,
   wherein a bottom surface of the at least one shelf comprises a plurality of slots disposed between opposing sides of the shelf, said slots adapted to receive a support bar, said shelf further comprising a support bar fitted into at least one of said plurality of slots such that a surface of the support bar is coplanar with the bottom surface of the shelf so that both the surface of the support bar and the bottom surface of the shelf contact the top surface of the shelf supports.

3. An adjustable storage unit for a vehicle comprising:
   a frame system including a pair of end panels positioned opposite and parallel one another;
   at least one pair of opposing shelf supports configured to be releasably connected to the opposed end panels;
   at least one shelf formed from a polymer material disposed in the frame system, the at least one shelf supported within the frame system by releasably coupling the shelf to the shelf supports; and
   at least one support bar extending between side edges of the shelf such that a surface of the support bar is coplanar with a bottom surface of the shelf so that both the surface of the support bar and the bottom surface of the shelf rest on the opposing shelf supports.

4. The adjustable storage unit of claim 3 wherein the bar is removable from the shelf.

5. The adjustable storage unit of claim 3 wherein the shelf includes a plurality of slots disposed between opposing side edges of the shelf, the slots adapted to receive the at least one support bar.

6. The adjustable storage unit of claim 3 wherein the bottom surface of the shelf includes at least one slot extending upwardly from the bottom surface and being disposed between the side edges of the shelf, and further wherein the slot is adapted to receive the support bar to vary a load rating of the shelf.

7. An adjustable storage unit for a vehicle, comprising:
   a pair of opposing end panels;
   a pair of opposing shelf supports configured to be releasably connected to the inner surface of the end panels;
   a shelf formed of a polymer material and disposed between the end panels, wherein the shelf is releasably coupled to the pair of opposing shelf supports; and
   a support bar extending between side edges of the shelf such that a surface of the support bar is coplanar with a bottom surface of the shelf so that both the surface of the support bar and the bottom surface of the shelf rest on opposing shelf supports.

8. The adjustable storage unit of claim 7 wherein the bottom surface of the shelf includes at least one slot disposed between the side edges of the shelf, and further wherein the slot is adapted to receive the support bar to vary a load rating of the shelf.

9. An adjustable storage unit for a vehicle comprising:
   a first end panel formed from a polymer material;
   a second end panel formed from a polymer material, the second end panel positioned opposite and substantially parallel to the first end panel;
   at least one shelf support releasably connected to the first end panel;
   at least one shelf support releasably connected to the second end panel and positioned opposite the shelf support releasably connected to the first end panel;
   at least one shelf formed from a polymer material and having a bottom surface, the shelf positioned between said end panels and supported by the shelf supports; and
   at least one support bar extending between side edges of the shelf such that a surface of the support bar is coplanar with the bottom surface of the shelf so that both the surface of the support bar and the bottom surface of the shelf rest on opposing shelf supports.

10. The adjustable storage unit of claim 9 wherein the bottom surface of the shelf includes at least one slot disposed between the side edges of the shelf, and further wherein the slot is adapted to receive the at least one support bar to vary a load rating of the shelf.

11. A method for adjusting the load rating of a shelf formed from a polymer material, the method comprising:
   providing at least one shelf formed from a polymer, said shelf having a bottom surface and a plurality of slots extending between the opposing sides of the shelf; and
   selectively inserting at least one support bar within at least one of said plurality of slots such that a surface of the support bar is coplanar with the bottom surface of the shelf so that both the surface of the support bar and the bottom surface of the shelf are positioned to rest on opposing shelf supports, wherein the load rating of the shelf is adjusted by removing or inserting support bars from the plurality of slots.

* * * * *

UNITED STATES PATENT AND TRADEMARK OFFICE
CERTIFICATE OF CORRECTION

PATENT NO. : 7,641,253 B2 Page 1 of 1
APPLICATION NO. : 11/501476
DATED : January 5, 2010
INVENTOR(S) : Steiger et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 443 days.

Signed and Sealed this

Sixteenth Day of November, 2010

David J. Kappos
*Director of the United States Patent and Trademark Office*